(12) United States Patent
Satou

(10) Patent No.: US 11,920,839 B2
(45) Date of Patent: Mar. 5, 2024

(54) REFRIGERATION SYSTEM

(71) Applicant: DAIKIN INDUSTRIES, LTD., Osaka (JP)

(72) Inventor: Kiichirou Satou, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 943 days.

(21) Appl. No.: 16/757,871

(22) PCT Filed: Sep. 28, 2018

(86) PCT No.: PCT/JP2018/036408
§ 371 (c)(1),
(2) Date: Apr. 21, 2020

(87) PCT Pub. No.: WO2019/082599
PCT Pub. Date: May 2, 2019

(65) Prior Publication Data
US 2020/0340723 A1  Oct. 29, 2020

(30) Foreign Application Priority Data
Oct. 25, 2017  (JP) .................. 2017-206316

(51) Int. Cl.
*F25B 47/02* (2006.01)
*F25D 13/02* (2006.01)
*F25D 21/06* (2006.01)

(52) U.S. Cl.
CPC ............. *F25B 47/02* (2013.01); *F25D 13/02* (2013.01); *F25D 21/06* (2013.01); *F25B 2600/02* (2013.01)

(58) Field of Classification Search
CPC ................. F25B 47/02; F25B 2600/23; F25B 2700/21172; F25B 2700/21173; F25D 13/02; F25D 21/06; F25D 21/006; F25D 2600/02
See application file for complete search history.

(56) References Cited

U.S. PATENT DOCUMENTS

2013/0014527 A1* 1/2013 Lukasse ............... F25D 29/003
62/89
2016/0047583 A1 2/2016 Lee et al.

FOREIGN PATENT DOCUMENTS

| CN | 102889010 A | 1/2013 |
| JP | 62-219111 A | 9/1987 |
| JP | 5-118732 A | 5/1993 |

(Continued)

OTHER PUBLICATIONS

English translation of International Preliminary Report on Patentability, Written Opinion of the International Searching Authorigy for International Application No. PCT/JP2018/036408, dated Apr. 28, 2020.

(Continued)

*Primary Examiner* — Joseph F Trpisovsky
(74) *Attorney, Agent, or Firm* — Birch, Stewart, Kolasch & Birch, LLP

(57) ABSTRACT

A refrigeration system including a storage in which multiple containers are joined and each include a refrigeration apparatus includes a first communication unit, a second communication unit, and a third communication unit that perform communication so that the refrigeration apparatuses of the containers operate in synchronization with each other.

13 Claims, 16 Drawing Sheets

(56) References Cited

FOREIGN PATENT DOCUMENTS

| JP | H06-313653 A | 11/1994 |
| JP | 11-23040 A | 1/1999 |
| JP | 2001-305255 A | 10/2001 |
| JP | 2002-181430 A | 6/2002 |
| JP | 2004-293923 A | 10/2004 |
| JP | 2005-76998 A | 3/2005 |
| JP | 2006-194512 A | 7/2006 |
| JP | 2008-8558 A | 1/2008 |
| JP | 4159243 B2 | 10/2008 |
| JP | 2011-112270 A | 6/2011 |
| JP | 2013-054482 A | 3/2013 |
| JP | 2015-16841 A | 1/2015 |
| JP | 2015-37361 A | 2/2015 |
| JP | 2017-147923 A | 8/2017 |
| JP | 2017-161102 A | 9/2017 |

OTHER PUBLICATIONS

English translation of International Search Report for International Application No. PCT/JP2018/036408, dated Dec. 18, 2018.
Extended European Search Report of Application No. EP 18871691 dated Jul. 9, 2021.

* cited by examiner

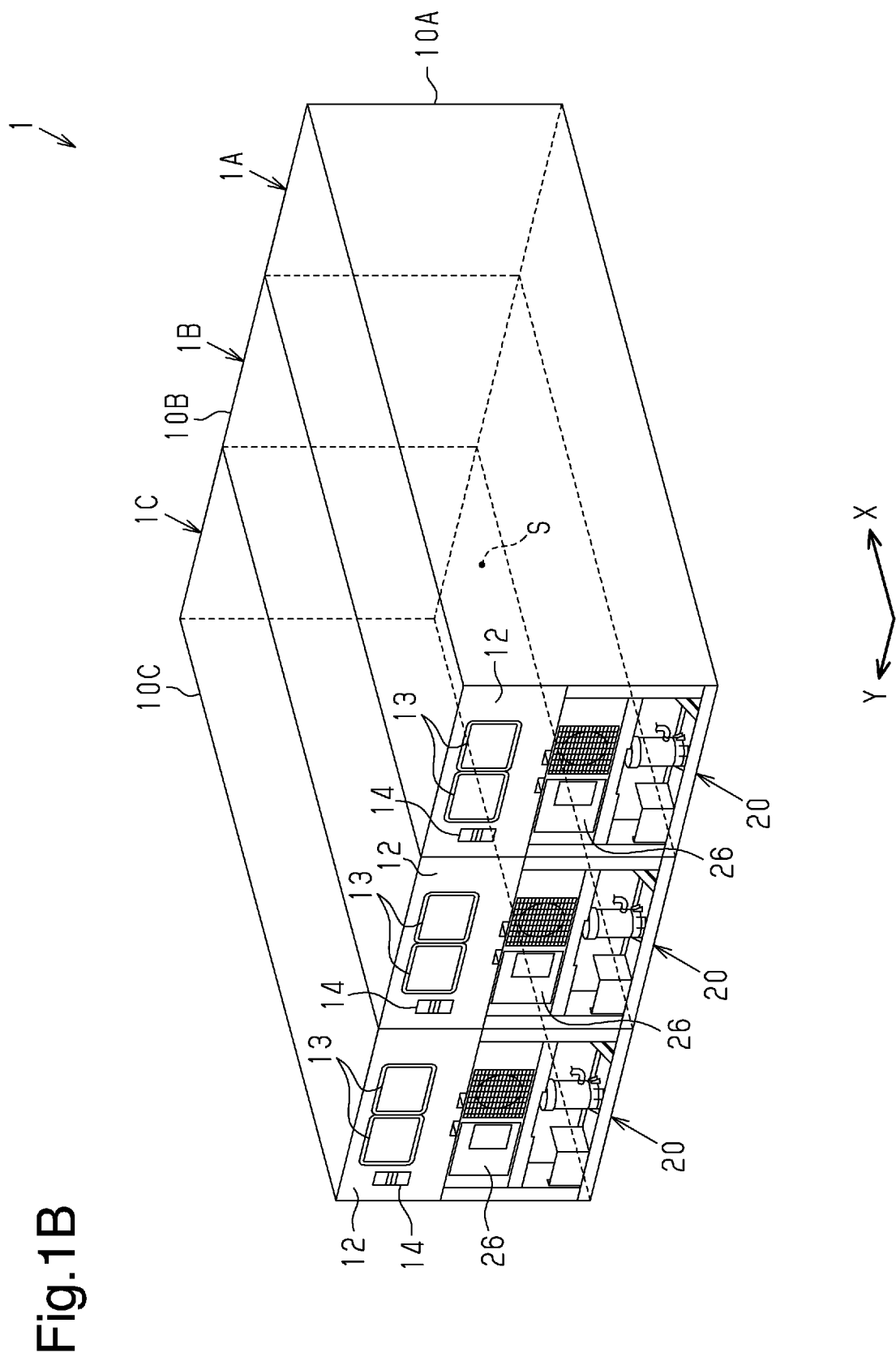

REFRIGERATION SYSTEM

TECHNICAL FIELD

The present disclosure relates to a refrigeration system that uses multiple refrigeration apparatuses to refrigerate and cool a storage configured by joining multiple containers.

BACKGROUND ART

An example of a known storage that stores loads is a container including a refrigeration apparatus for refrigerating and cooling the inside of the storage (for example, refer to Patent Document 1).

PRIOR ART DOCUMENT

Patent Document

Patent Document 1: Japanese Laid-Open Patent Publication No. 2011-112270

SUMMARY OF THE INVENTION

Problems that the Invention is to Solve

Multiple containers including refrigeration apparatuses may be joined together to configure a storage. In this case, the refrigeration apparatuses of the containers are separately controlled so that each container separately performs a refrigerating-cooling operation. Since no consideration is made to a synchronous operation between the containers, there is room for improvement in this point.

It is an object of the present disclosure to provide a refrigeration system that synchronously operates refrigeration apparatuses of multiple containers.

Means for Solving the Problems

To achieve the object, a refrigeration system includes a storage in which multiple containers are joined and each include a refrigeration apparatus. The refrigeration system includes communication units that perform communication so that the refrigeration apparatuses of the containers operate in synchronization with each other.

With this configuration, the refrigeration apparatuses of the containers are synchronously controlled through the communication units. This allows the refrigeration apparatuses of the containers to operate in synchronization with each other.

BRIEF DESCRIPTION OF THE DRAWINGS

FIG. 1B is a perspective view of the three containers that are joined.

MODES FOR CARRYING OUT THE INVENTION

First Embodiment

As an embodiment of a refrigeration system, a refrigeration system used as a stationary storage configured by joining multiple containers will now be described with reference to the drawings.

Figure 1A:
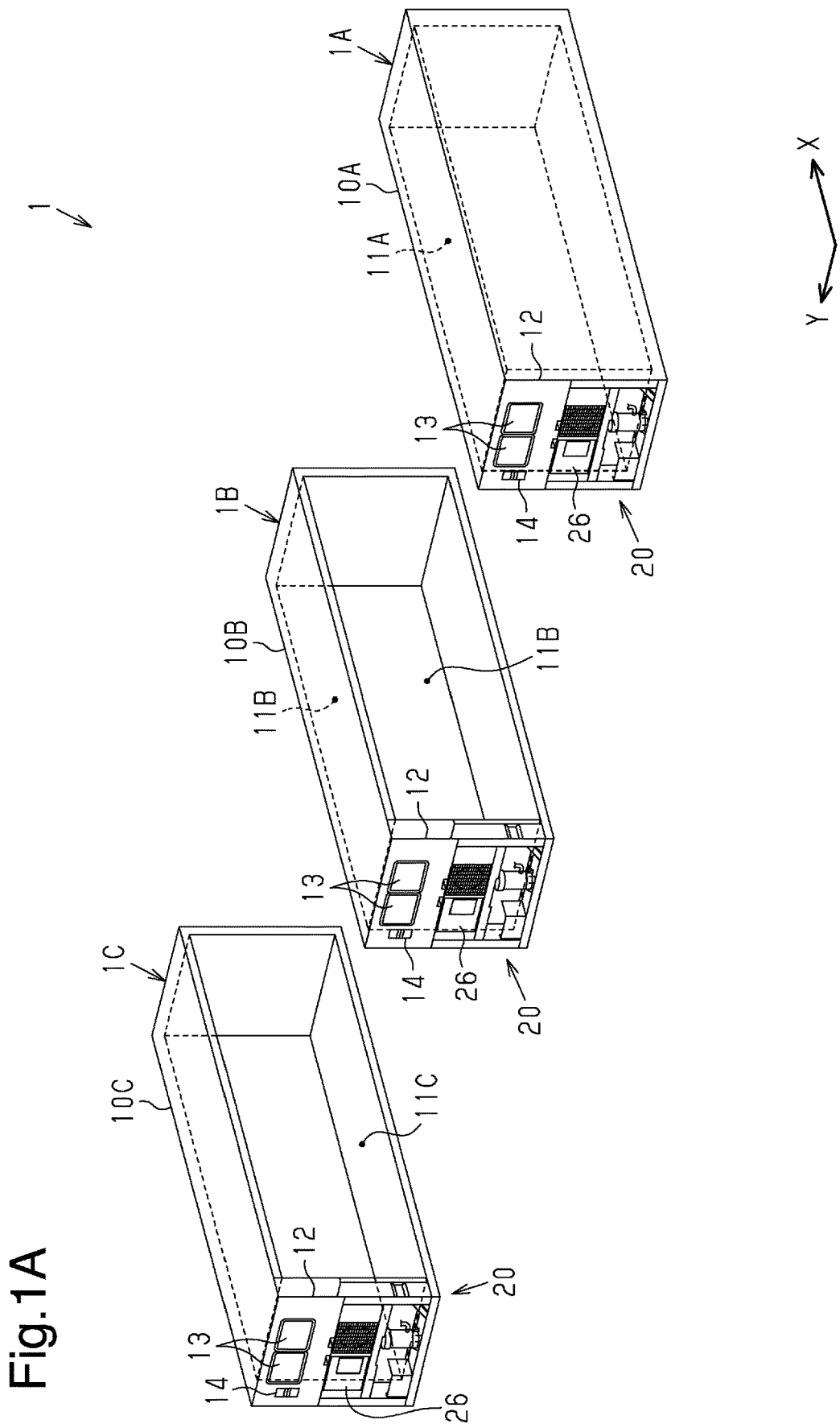
FIG. 1A is a perspective view of three containers in a first embodiment of a refrigeration system.

As shown in FIG. 1A, a refrigeration system 1 is used as a stationary storage in which a first container 1A, a second container 1B, and a third container 1C are joined together. The first container 1A includes an elongated-box-shaped casing 10A. The second container 1B and the third container 1C include a casing 10B and a casing 10C in the same manner as the first container 1A. In the description hereafter, the longitudinal direction of the containers 1A to 1C is defined as "the first direction X," and a direction orthogonal to the first direction X is defined as "the second direction Y."

In the second direction Y, the first container 1A is located at one side of the second container 1B, and the third container 1C is located at the other side of the second container 1B. The first container 1A includes an opening 11A formed by removing a wall of the first container 1A from a portion opposed to the second container 1B. The third container 1C includes an opening 11C formed by removing a wall of the third container 1C from a portion opposed to the second container 1B. The second container 1B includes openings 11B formed by removing walls of the second container 1B from portions opposed to the first container 1A and the third container 1C.

As shown in FIG. 1B, the first container 1A is joined to the second container 1B, and the third container 1C is joined to the second container 1B so that the second container 1B is sandwiched between the first container 1A and the third container 1C. This defines a single accommodation space S that connects the first container 1A, the second container 1B, and the third container 1C in the refrigeration system 1. The accommodation space S accommodates, for example, loads CG (refer to FIG. 2).

Each of the containers 1A to 1C includes a refrigeration apparatus 20. That is, the refrigeration system 1 including the containers 1A to 1C includes multiple (in the present embodiment, three) refrigeration apparatuses 20. The refrigeration apparatuses 20 refrigerate and cool the accommodation space S, which is the inside of the storage. The refrigeration apparatuses 20 are installed on respective walls 12 of the casings 10A to 10C.

Figure 2:
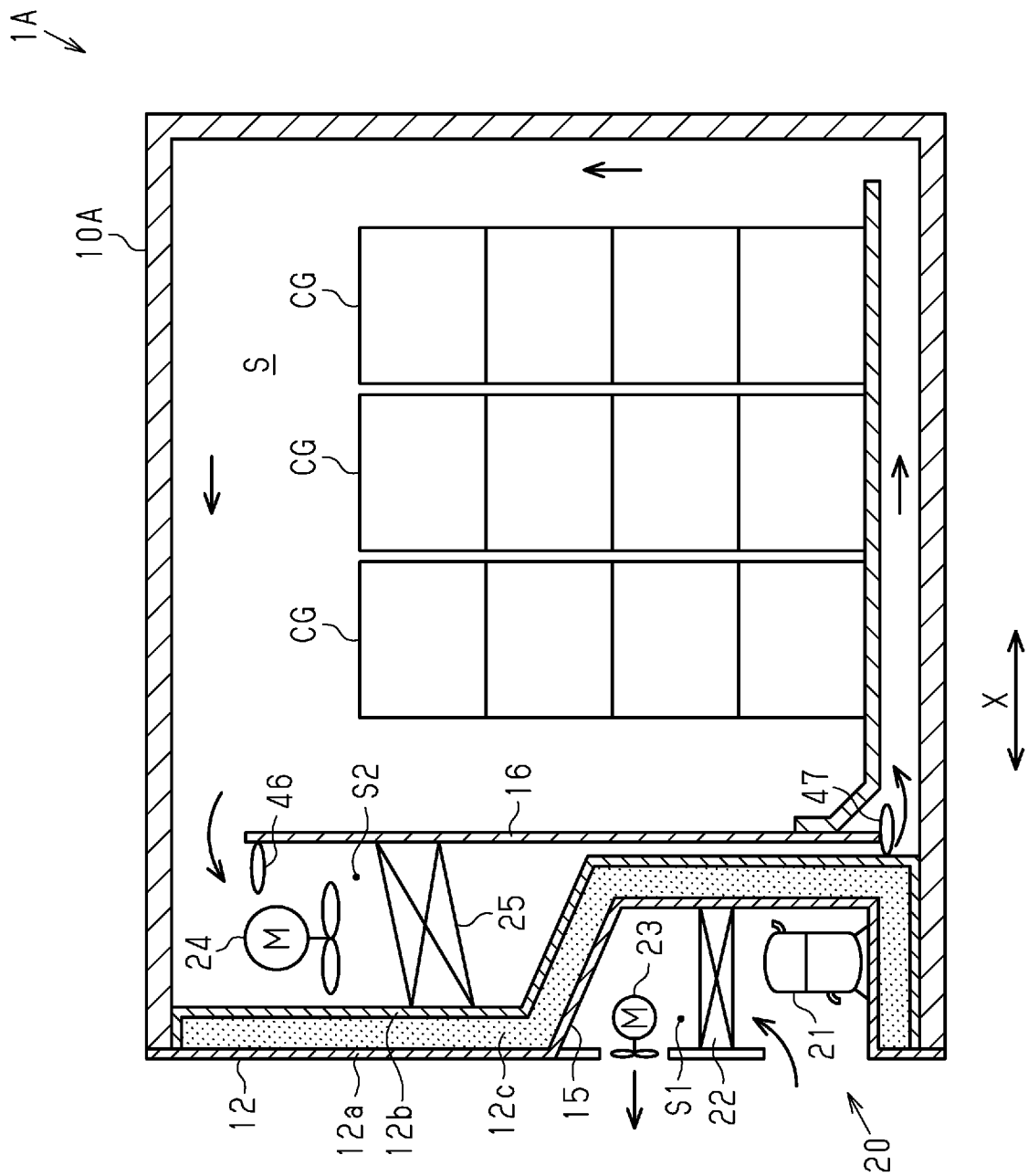
FIG. 2 is a vertical cross-sectional view of one of the containers.

Each of the containers 1A to 1C includes observation windows 13 and a ventilator 14 in an upper portion of the front side of the wall 12 in the first direction X. Each observation window 13 includes a door configured to open and close during maintenance. The ventilator 14 ventilates the storage. Two observation windows 13 are arranged next to each other in the second direction Y on the upper portion of the wall 12. The walls 12 of the containers 1A to 1C have the same structure. FIG. 2 shows the structure of the wall 12 of the first container 1A as an example.

As shown in FIG. 2, a lower portion of the wall 12 is bulged toward the interior of the first container 1A to form a concave portion 15. As a result, an exterior accommodation space S1 is defined at an exterior side of the lower portion of the wall 12, and an interior accommodation space S2 is defined at an interior side of the upper portion of the wall 12. The wall 12 includes a metal exterior casing 12a, a metal interior casing 12b, and a thermal insulation layer 12c sandwiched between the metal exterior casing 12a and the metal interior casing 12b. An example of the material of the exterior casing 12a and the interior casing 12b is aluminum. The thermal insulation layer 12c is formed of a foamed material.

A partition plate 16 is disposed in an interior side of the casing 10A to separate the accommodation space S and the interior accommodation space S2 of the casing 10A. The partition plate 16 is spaced apart from the wall 12 in the first direction X.

The exterior accommodation space S1 and the interior accommodation space S2 accommodate the refrigeration apparatus 20 including a refrigerant circuit 30. More specifically, the refrigeration apparatuses 20 includes, for example, a compressor 21, a condenser 22, an exterior fan 23, an interior fan 24, an evaporator 25, and an electric component 26 (refer to FIG. 1B). The exterior accommodation space S1 accommodates the compressor 21, the condenser 22, the exterior fan 23, and the electric component 26. The interior accommodation space S2 accommodates the interior fan 24 and the evaporator 25. The refrigeration apparatus 20 including a refrigerant circuit 30 of the second container 1B and the refrigeration apparatus 20 including a refrigerant circuit 30 of the third container 1C have the same structure as the refrigeration apparatus 20 including the refrigerant circuit 30 of the first container 1A. In the description hereafter, the refrigeration apparatus 20 of the first container 1A will be described. The refrigeration apparatus 20 of the second container 1B and the refrigeration apparatus 20 of the third container 1C will not be described in detail.

Figure 3:
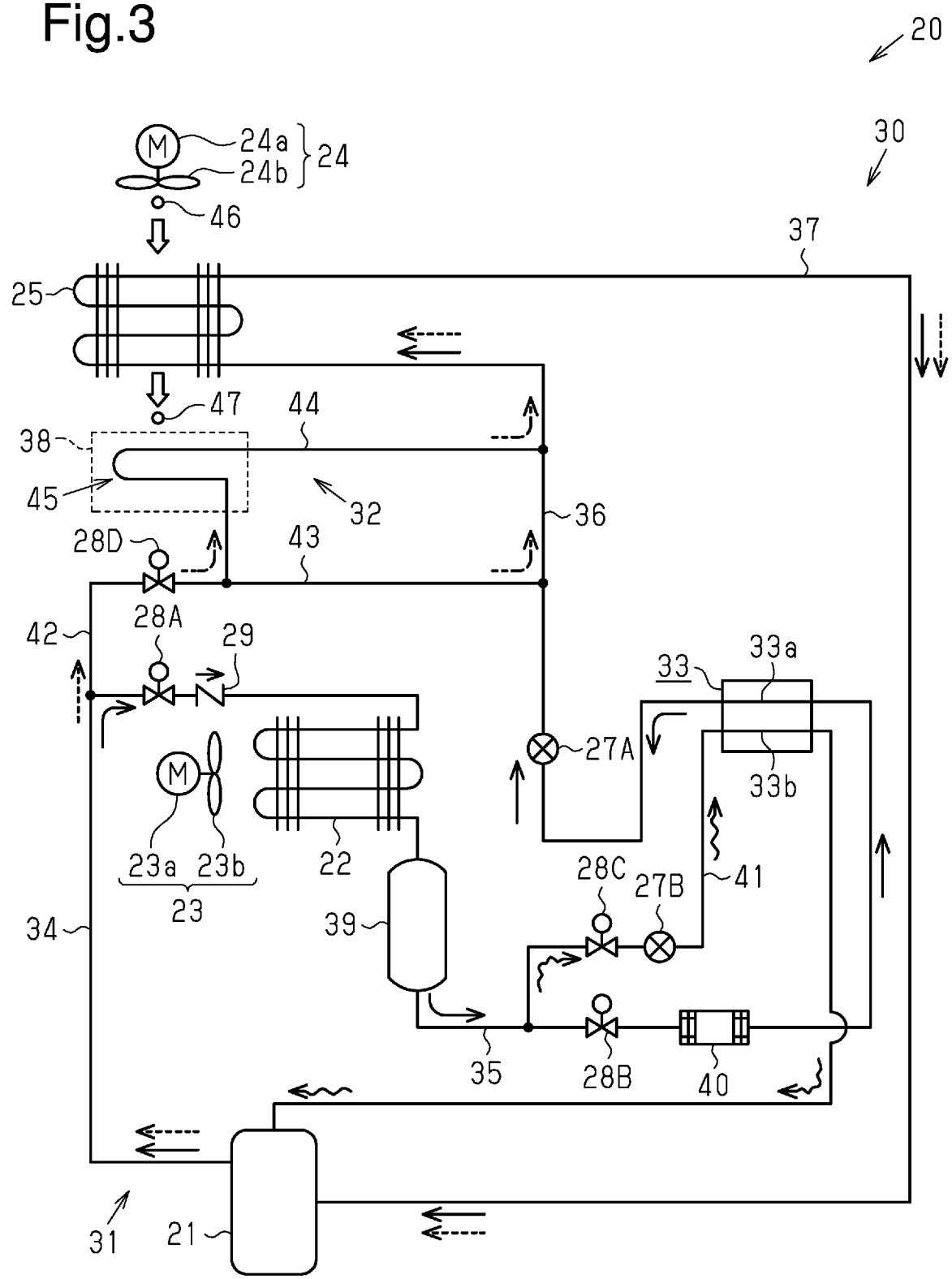
FIG. 3 is a conceptual diagram of a refrigeration apparatus installed in a container.

As shown in FIG. 3, the refrigeration apparatus 20 includes the refrigerant circuit 30 in which, for example, the compressor 21, the condenser 22, and the evaporator 25 are connected by a refrigerant pipe. The refrigerant circuit 30 includes a main circuit 31, a hot gas bypass circuit 32, and a liquid refrigerant bypass circuit 41.

The main circuit 31 is configured by sequentially connecting the compressor 21 that is driven by a motor, the condenser 22, a first expansion valve 27A, and the evaporator 25 in series with the refrigerant pipe.

As shown in FIG. 3, the exterior accommodation space accommodates, for example, the compressor 21, the condenser 22, the first expansion valve 27A, and the exterior fan 23, which circulates the air outside the storage to the condenser 22. The interior accommodation space accommodates, for example, the evaporator 25 and the interior fan 24, which circulates the air in the storage to the evaporator 25.

The compressor 21 may be, for example, a rotary compressor or a scroll compressor. The compressor 21 is configured so that the operating capacity is variable when an inverter controls the operating frequency to control the rotational speed.

The condenser 22 and the evaporator 25 may be a fin-and-tube heat exchanger. The condenser 22 exchanges heat between the air outside the storage supplied by the exterior fan 23 and the refrigerant circulating in the condenser 22. The evaporator 25 exchanges heat between the air in the storage supplied by the interior fan 24 and the refrigerant circulating in the evaporator 25. An example of the exterior fan 23 and the interior fan 24 is a propeller fan. A drain pan 38 is disposed below the evaporator 25. The drain pan 38 collects, for example, frost and ice blocks falling from the evaporator 25 and water condensed from the air.

The first expansion valve 27A may be, for example, an electric expansion valve configured so that the opening degree is variable using a pulse motor.

The compressor 21 and the condenser 22 are connected by a high pressure gas pipe 34 that includes a first opening-closing valve 28A and a check valve 29 sequentially arranged in a direction in which the refrigerant flows. The first opening-closing valve 28A may be, for example, an electric expansion valve configured so that the opening degree is variable using a pulse motor. The check valve 29 allows the refrigerant to flow in directions of arrows shown in FIG. 3.

The condenser 22 and the first expansion valve 27A are connected by a high pressure liquid pipe 35 that includes a receiver 39, a second opening-closing valve 29B, a dryer 40, and a supercooling heat exchanger 33 sequentially arranged in the direction in which the refrigerant flows. The second opening-closing valve 29B may be, for example, an electromagnetic valve configured to open and close.

The supercooling heat exchanger 33 includes a primary passage 33a and a secondary passage 33b configured to exchange heat with each other. The primary passage 33a is disposed in the main circuit 31 between the dryer 40 and the first expansion valve 27A. The secondary passage 33b is disposed in the liquid refrigerant bypass circuit 41. The liquid refrigerant bypass circuit 41 is a bypass circuit that connects the high pressure liquid pipe 35 and an intermediate pressure portion (not shown) of a compression mechanism of the compressor 21. A third opening-closing valve 29C and a second expansion valve 27B are sequentially connected, in the direction in which the high pressure liquid refrigerant flows, to the liquid refrigerant bypass circuit 41 between the high pressure liquid pipe 35 and the secondary passage 33b. In this configuration, when the liquid refrigerant flows into the liquid refrigerant bypass circuit 41 from the high pressure liquid pipe 35, the second expansion valve 27B expands the liquid refrigerant to an intermediate pressure, so that the liquid refrigerant has a lower temperature than the liquid refrigerant flowing through the high pressure liquid pipe 35 and flows to the secondary passage 33b. Thus, the high pressure liquid refrigerant flowing through the primary passage 33a is supercooled by the refrigerant flowing through the secondary passage 33b. The third opening-closing valve 29C may be, for example, an electromagnetic valve configured to open and close. The second expansion valve 27B may be, for example, an electric expansion valve configured so that the opening degree is variable using a pulse motor.

The hot gas bypass circuit 32 connects a high pressure gas pipe 34 and the inlet side of the evaporator 25 to send the high-pressure high-temperature gas refrigerant discharged from the compressor 21 to the inlet side of the evaporator 25. The hot gas bypass circuit 32 includes a main passage 42, and a first branch passage 43 and a second branch passage 44 divided from the main passage 42. The first branch passage 43 and the second branch passage 44 configure a parallel circuit in which one end of each of the first branch passage 43 and the second branch passage 44 is connected to the main passage 42 and the other end is connected to the inlet side of the evaporator 25, that is, a low pressure connection pipe 36 that extends between the first expansion valve 27A and the evaporator 25. The main passage 42 includes a fourth opening-closing valve 29D. The fourth opening-closing valve 29D may be, for example, an electromagnetic valve configured to open and close. The first branch passage 43 includes only a pipe. The second branch passage 44 includes a drain pan heater 45. The drain pan heater 45 is disposed at the bottom of the drain pan 38 to heat the drain pan 38 with the refrigerant having a high temperature.

The refrigeration apparatus 20 including the refrigerant circuit 30 is provided with various sensors. In an example, the refrigeration apparatus 20 includes an intake air temperature detector 46 and a blow-out air temperature detector 47. The intake air temperature detector 46 is disposed at the intake side of the evaporator 25 to detect the temperature of the air in the storage immediately before passing through the evaporator 25. The blow-out air temperature detector 47 is disposed at the blow-out side of the evaporator 25 to detect the temperature of the air in the storage immediately after passing through the evaporator 25.

Figure 4:
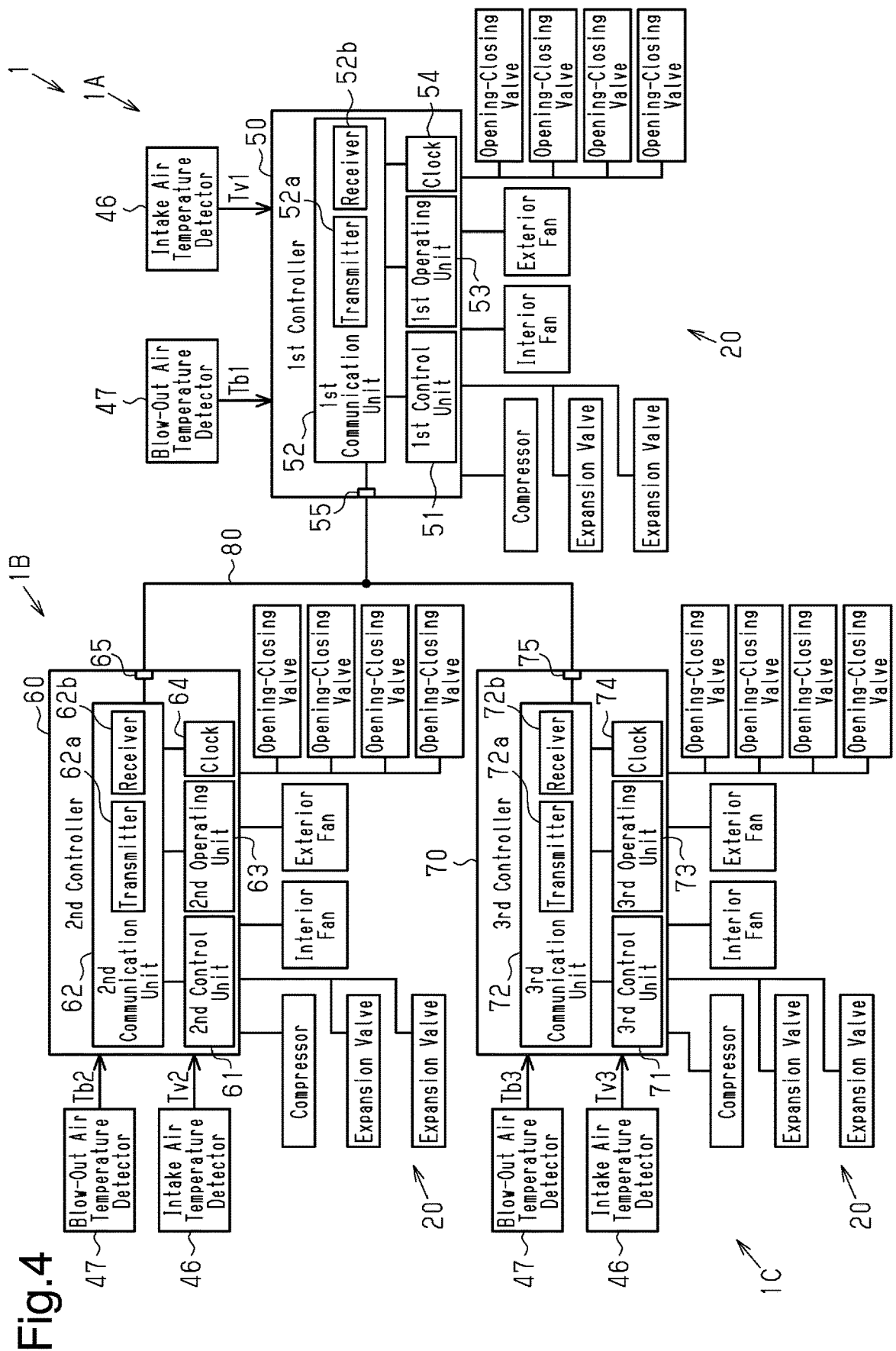
FIG. 4 is a block diagram showing the electrical configuration of the refrigeration system.

As shown in FIG. 4, the first container 1A of the refrigeration system 1 includes a first controller 50, the second container 1B includes a second controller 60, and the third container 1C includes a third controller 70. The first controller 50 receives a signal (hereafter, referred to as "intake air temperature Tv1") corresponding to the temperature of the air in the storage immediately before passing through the evaporator 25. The signal is a detection result of the intake air temperature detector 46 of the refrigeration apparatus 20 of the first container 1A. The first controller 50 also receives a signal (hereafter, referred to as "blow-out air temperature Tb1") corresponding to the temperature of the air in the storage immediately after passing through the evaporator 25. The signal is a detection result of the blow-out air temperature detector 47 of the refrigeration apparatus 20 of the first container 1A. The second controller 60 receives a signal (hereafter, referred to as "intake air temperature Tv2") corresponding to the temperature of the air in the storage immediately before passing through the evaporator 25. The signal is a detection result of the intake air temperature detector 46 of the refrigeration apparatus 20 of the second container 1B. The second controller 60 also receives a signal (hereafter, referred to as "blow-out air temperature Tb2") corresponding to the temperature of the air in the storage immediately after passing through the evaporator 25. The signal is a detection result of the blow-out air temperature detector 47 of the refrigeration apparatus 20 of the second container 1B. The third controller 70 receives a signal (hereafter, referred to as "intake air temperature Tv3") corresponding to the temperature of the air in the storage immediately before passing through the evaporator 25. The signal is a detection result of the intake air temperature detector 46 of the refrigeration apparatus 20 of the third container 1C. The third controller 70 also receives a signal (hereafter, referred to as "blow-out air temperature Tb3") corresponding to the temperature of the air in the storage immediately after passing through the evaporator 25. The signal is a detection result of the blow-out air temperature detector 47 of the refrigeration apparatus 20 of the third container 1C. The first controller 50, the second controller 60, and the third controller 70 have the same configuration.

The first controller 50 includes a first control unit 51, which is an example of a control unit, a first communication unit 52, which is an example of a communication unit, a first operating unit 53, which is an example of an operating unit, and a clock 54. The first control unit 51 includes, for example, an arithmetic processing unit that executes a predetermined control program and a storage unit. The arithmetic processing unit includes, for example, a central processing unit (CPU) or a micro processing unit (MPU). The storage unit stores various control programs and information used for various control processes. The storage unit includes, for example, a nonvolatile memory and a volatile memory. The first communication unit 52 includes a transmitter 52a and a receiver 52b. The first communication unit 52 is electrically connected to the first control unit 51, the first operating unit 53, and the clock 54. The first communication unit 52 communicates with the second controller 60 and the third controller 70. The first operating unit 53 includes a touch screen or the like. When operated by an operator, the first operating unit 53 sends operating information such as a change in various settings to the first control unit 51. The clock 54 may be, for example, an analog quartz clock.

In the same manner as the first controller 50, the second controller 60 includes a second control unit 61, which is an example of a control unit, a second communication unit 62, which is an example of a communication unit, a second operating unit 63, which is an example of an operating unit, and a clock 64. The second communication unit 62 includes a transmitter 62a and a receiver 62b.

In the same manner as the first controller 50, the third controller 70 includes a third control unit 71, which is an example of a control unit, a third communication unit 72, which is an example of a communication unit, a third operating unit 73, which is an example of an operating unit, and a clock 74. The third communication unit 72 includes a transmitter 72a and a receiver 72b.

The first communication unit 52, the second communication unit 62, and the third communication unit 72 are configured so that the refrigeration apparatuses 20 of the containers 1A to 1C connect and communicate with each other. More specifically, the first communication unit 52, the second communication unit 62, and the third communication unit 72 are connected so as to perform communication with each other. In the present embodiment, the first communication unit 52, the second communication unit 62, and the third communication unit 72 are connected by a communication line 80. More specifically, the communication line 80 is connected to a communication port 55 of the first controller 50, a communication port 65 of the second controller 60, and a communication port 75 of the third controller 70.

The communication port 55 of the first controller 50 is electrically connected to the first communication unit 52. The communication port 65 of the second controller 60 is electrically connected to the second communication unit 62. The communication port 75 of the third controller 70 is electrically connected to the third communication unit 72.

The control units 51, 61, and 71 control operations of the containers 1A to 1C such as a refrigerating-cooling operation and a defrosting operation. The refrigerating-cooling operation and the defrosting operation will now be described with reference to FIG. 3.

Refrigerating-Cooling Operation

In the refrigerating-cooling operation, the first opening-closing valve 28A, a second opening-closing valve 28B, and a third opening-closing valve 28C are open, and a fourth opening-closing valve 28D is closed. The opening degrees of the first expansion valve 27A and the second expansion valve 27B are appropriately adjusted. Also, the compressor 21, the exterior fan 23, and the interior fan 24 are operated.

In the refrigerating-cooling operation, the refrigerant circulates as indicated by the solid arrows. More specifically, the gas refrigerant is compressed in the compressor 21 and is condensed in the condenser 22 to become the liquid refrigerant. Subsequently, the liquid refrigerant is stored in the receiver 39. The liquid refrigerant flows from the receiver 39 through the second opening-closing valve 28B and the dryer 40. The liquid refrigerant is supercooled in the primary passage 33a of the supercooling heat exchanger 33 and flows to the first expansion valve 27A. As indicated by the wave arrows, a portion of the liquid refrigerant discharged from the receiver 39 flows as a supercooling source through the third opening-closing valve 28C and the second expansion valve 27B to become a low-pressure low-temperature refrigerant. The low-pressure low-temperature refrigerant flows to the secondary passage 33b of the supercooling heat exchanger 33 to supercool the liquid refrigerant in the primary passage 33a. The liquid refrigerant supercooled in the supercooling heat exchanger 33 is depressurized in the first expansion valve 27A and then flows through the evaporator 25. In the evaporator 25, the refrigerant absorbs heat from the air in the storage and evaporates. As a result, the air in the storage is cooled. The refrigerant evaporated in the evaporator 25 is drawn and compressed again in the compressor 21.

Defrosting Operation

When the refrigerating-cooling operation is continuously performed, frost collects on surfaces of, for example, a fin and a heat transfer tube of the evaporator 25. The frost gradually develops and enlarges. The controllers 50, 60, and 70 perform the defrosting operation, that is, an operation for removing frost from the evaporators 25.

As indicated by the broken arrows, the defrosting operation directly supplies a high-temperature high-pressure gas refrigerant, which is compressed in the compressor 21, to the evaporator 25 bypassing the condenser 22, the receiver 39, the supercooling heat exchanger 33, and the first expansion valve 27A. In the defrosting operation, the fourth opening-closing valve 28D is open, and the first opening-closing valve 28A, the second opening-closing valve 28B, the third opening-closing valve 28C, and the second expansion valve 27B are fully closed. The compressor 21 starts to operate, and the exterior fan 23 and the interior fan 24 are stopped.

The high-pressure gas refrigerant compressed in the compressor 21 flows through the main passage 42 and the fourth opening-closing valve 28D and then divides into the first branch passage 43 and the second branch passage 44. The refrigerant divided into the second branch passage 44 flows through the drain pan heater 45. The refrigerant discharged from the drain pan heater 45 joins the refrigerant that has passed through the first branch passage 43 and flows through the evaporator 25. In the evaporator 25, a high-pressure gas refrigerant (so-called hot gas) flows in the heat transfer tube. In the evaporator 25, the frost collected on the fin and the heat transfer tube is gradually heated from an inner side by the refrigerant. As a result, the drain pan 38 gradually receives the frost from the evaporator 25. The refrigerant used to defrost the evaporator 25 is drawn and compressed again in the compressor 21. For example, an ice block falls from the surface of the evaporator 25 and is received in the drain pan 38. The ice block is heated and melted by the refrigerant flowing in the drain pan heater 45. The melted water is discharged out of the storage through a predetermined flow passage.

Synchronized Control

In the refrigeration system 1, the containers 1A to 1C define the accommodation space S, and the refrigerating-cooling operation and the defrosting operation are performed in the accommodation space S. When the refrigerating-cooling operation is performed, after a predetermined time has elapsed from the start of the refrigerating-cooling operation, the controllers 50, 60, and 70 of the containers 1A to 1C start the defrosting operation. Since the times of the clocks 54, 64, and 74 of the controllers 50, 60, and 70 are set by an operator, the operator may set the clocks 54, 64, and 74 to different times. When analog quartz clocks are used as the clocks 54, 64, and 74, the times of the clocks 54, 64, and 74 may differ from each other as time elapses. As a result, while one or more of the containers 1A to 1C start the defrosting operation, the rest of the containers 1A to 1C do not start the defrosting operation, that is, continue the refrigerating-cooling operation. This refrigerating-cooling operation may hinder completion of defrosting of the one or more of the containers 1A to 1C and termination of the defrosting operation. In addition, when the rest of the containers 1A to 1C perform the defrosting operation, the temperature of the accommodation space S will increase. This causes the one or more of the containers 1A to 1C performing the refrigerating-cooling operation to use power more than necessary for performing the refrigerating-cooling operation to reduce the temperature of the accommodation space S. As a result, the accommodation space S may be locally overcooled.

In this regard, the refrigeration system 1 of the present embodiment executes synchronized control that synchronously operates the refrigeration apparatuses 20 of the containers 1A to 1C. In an example of synchronized control, the refrigeration system 1 synchronizes timing at which the refrigeration apparatuses 20 of the containers 1A to 1C start the defrosting operation. Preferably, in synchronized control, the refrigeration system 1 synchronizes timing at which the refrigeration apparatuses 20 of the containers 1A to 1C end the defrosting operation. More preferably, in synchronized control, after the refrigeration apparatuses 20 of the containers 1A to 1C end the defrosting operation, the refrigeration system 1 synchronizes the start timing of the refrigerating-cooling operation.

When executing the synchronized control, the controllers 50, 60, and 70 of the containers 1A to 1C set one of the controllers 50, 60, and 70 to a master device and set the remaining two controllers to slave devices. For example, the first control unit 51 of the first controller 50 is set to a main control unit, and the second control unit 61 of the second controller 60 and the third control unit 71 of the third controller 70 are set to slave control units. The first communication unit 52 transmits time information of the clock 54 of the first controller 50 to the second communication unit 62 and the third communication unit 72. In the synchronized control of the present embodiment, the containers 1A to 1C synchronously start each of the defrosting operation and the refrigerating-cooling operation based on the time of the clock of the master device.

Figure 5:
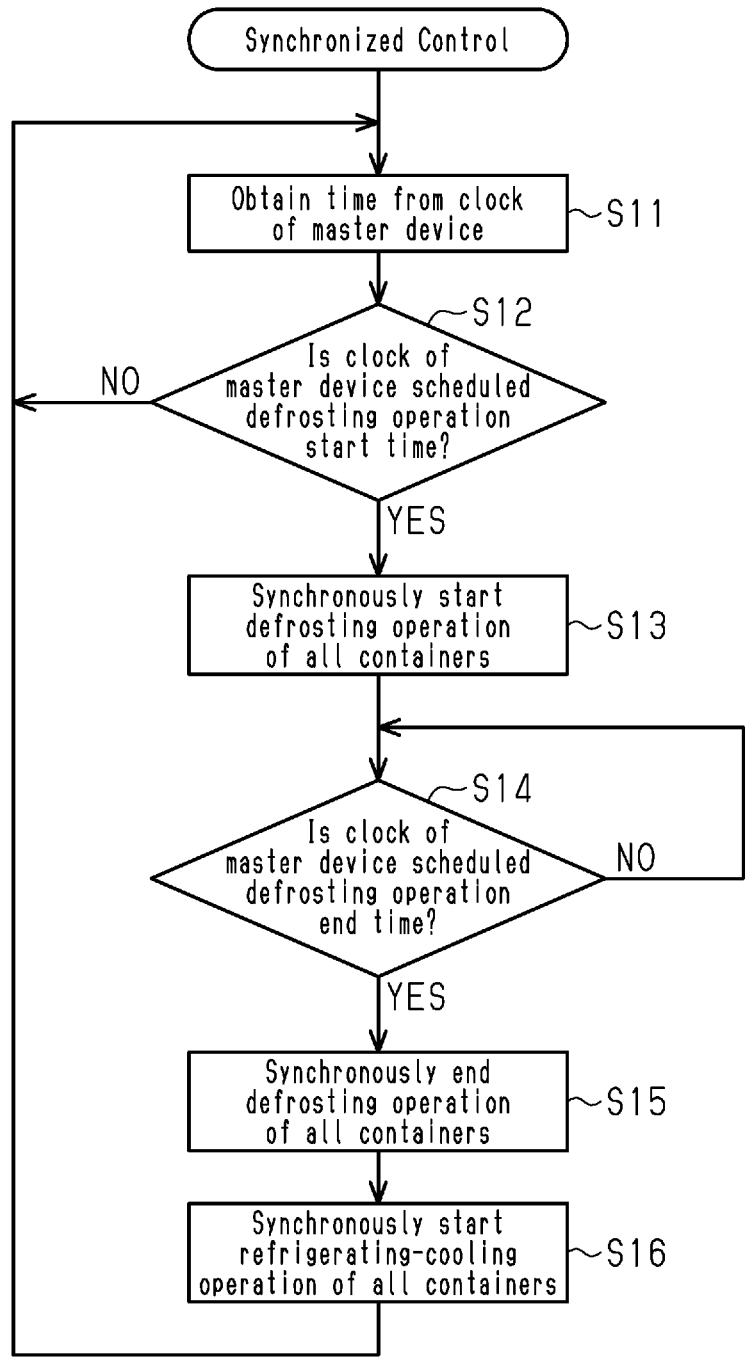
FIG. 5 is a flowchart showing the procedures of synchronized control executed by a main control unit.

The first control unit 51 executes the synchronized control. The procedures of the synchronized control will now be described with reference to the flowchart shown in FIG. 5. The first control unit 51 executes the synchronized control in a period from when the refrigeration apparatuses 20 of the containers 1A to 1C start to operate to when the refrigeration apparatuses 20 of the containers 1A to 1C stops operating.

In step S11, the first control unit 51 obtains the time of the clock 54 of the master device (first controller 50). In step S12, the first control unit 51 determines whether the time of the clock 54 of the master device is a scheduled start time of the defrosting operation. The scheduled start time of the defrosting operation is set to, for example, a time after a predetermined time elapses from when the containers 1A to 1C start the refrigerating-cooling operation. The scheduled start time of the defrosting operation may be set to multiple times. In this case, an interval from a scheduled start time of the defrosting operation to the next scheduled start time of the defrosting operation is set to be greater than a period in which the defrosting operation is executed.

When determining that the time of the clock 54 of the master device is not the scheduled start time of the defrosting operation (step S12: NO), the first control unit 51 proceeds to step S11. When determining that the time of the clock 54 of the master device is the scheduled start time of the defrosting operation (step S12: YES), the first control unit 51 proceeds to step S13 and synchronizes all of the containers 1A to 1C to start the defrosting operation. More specifically, the first control unit 51 transmits a defrosting start synchronization signal to the second control unit 61 and the third control unit 71 through the first communication unit 52 and starts the defrosting operation of the first container 1A. The defrosting start synchronization signal is an instruction signal for synchronously starting the defrosting operations of all of the containers 1A to 1C. When receiving the defrosting start synchronization signal from the first control unit 51 through the second communication unit 62, the second control unit 61 starts the defrosting operation of the second container 1B. When receiving the defrosting start synchronization signal from the first control unit 51 through the third communication unit 72, the third control unit 71 starts the defrosting operation of the third container 1C.

In step S14, the first control unit 51 determines whether the time of the clock 54 of the master device is a scheduled end time of the defrosting operation. The scheduled end time of the defrosting operation is set to a time after a predetermined time elapses from the scheduled start time of the defrosting operation. When multiple scheduled start times of the defrosting operation are set, multiple scheduled end times of the defrosting operation are set in correspondence with the scheduled start times.

When determining that the time of the clock 54 of the master device is not the scheduled end time of the defrosting operation (step S14: NO), the first control unit 51 returns to the determination of step S14. That is, when all of the containers 1A to 1C start the defrosting operations, the defrosting operations of all of the containers 1A to 1C continue until the scheduled end time of the defrosting operation.

When determining that the time of the clock 54 of the master device is the scheduled end time of the defrosting operation (step S14: YES), the first control unit 51 proceeds to step S15 to synchronously end the defrosting operations of all of the containers 1A to 1C. More specifically, the first control unit 51 transmits a defrosting end synchronization signal to the second control unit 61 and the third control unit 71 through the first communication unit 52 and ends the defrosting operation of the first container 1A. The defrosting end synchronization signal is an instruction signal for synchronously ending the defrosting operations of all of the containers 1A to 1C. When receiving the defrosting end synchronization signal from the first control unit 51 through the second communication unit 62, the second control unit 61 ends the defrosting operation of the second container 1B. When receiving the defrosting end synchronization signal from the first control unit 51 through the third communication unit 72, the third control unit 71 ends the defrosting operation of the third container 1C.

In step S16, the first control unit 51 synchronously starts the refrigerating-cooling operations of all of the containers 1A to 1C. More specifically, the first control unit 51 transmits a refrigerating-cooling start synchronization signal to the second control unit 61 and the third control unit 71 through the first communication unit 52 and starts the refrigerating-cooling operation of the first container 1A. The refrigerating-cooling start synchronization signal is an instruction signal for synchronously resuming the refrigerating-cooling operations of all of the containers 1A to 1C. When receiving the refrigerating-cooling start synchronization signal from the first control unit 51 through the second communication unit 62, the second control unit 61 starts the refrigerating-cooling operation of the second container 1B. When receiving the refrigerating-cooling start synchronization signal from the first control unit 51 through the third communication unit 72, the third control unit 71 starts the refrigerating-cooling operation of the third container 1C. Then, the process returns to step S11.

Faulty Measures of Containers 1A to 1C

(a) First Faulty Measure

Figure 6:
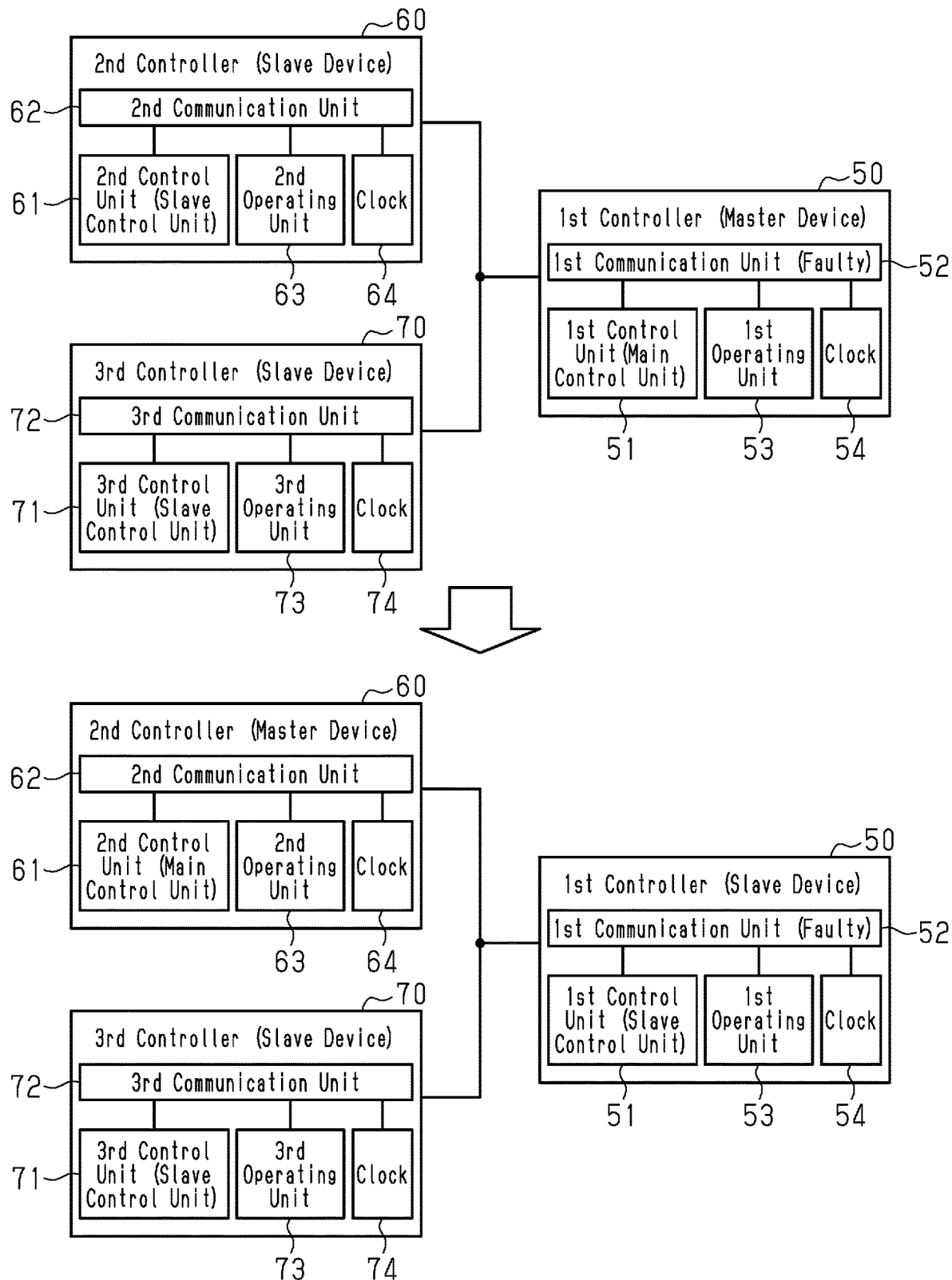
FIG. 6 is a block diagram showing a faulty measure taken when one of the controllers of the refrigeration apparatuses is faulty.

As described above, the master device (first controller 50) and the slave devices (second controller 60 and third controller 70) are set so that the synchronized control is executed. However, when the master device malfunctions as the master device, the master device may not be able to instruct the slave devices to start the defrosting operation or synchronize the refrigerating-cooling operations. This may result in a failure of execution of the synchronized control. In an example, as shown in the upper part of FIG. 6, when the transmitter 52*a* of the first communication unit 52 is faulty, that is, when the first communication unit 52 cannot transmit the defrosting start synchronization signal, a defrosting end synchronization instruction, and the refrigerating-cooling start synchronization signal to the second communication unit 62 and the third communication unit 72, the synchronized control cannot be executed.

In this regard, when the master device (first controller 50) malfunctions as the master device, the refrigeration system 1 of the present embodiment executes setting change control that sets one of the slave devices (second controller 60 and third controller 70) to a new master device and sets the master device (the first controller 50) to a slave device. In the setting change control, for example, as shown in the lower part of FIG. 6, when the second controller 60 is set to the master device, the second control unit 61 transmits the defrosting start synchronization signal, the defrosting end synchronization instruction, and the refrigerating-cooling start synchronization signal to the first control unit 51 and the third control unit 71.

Figure 7:
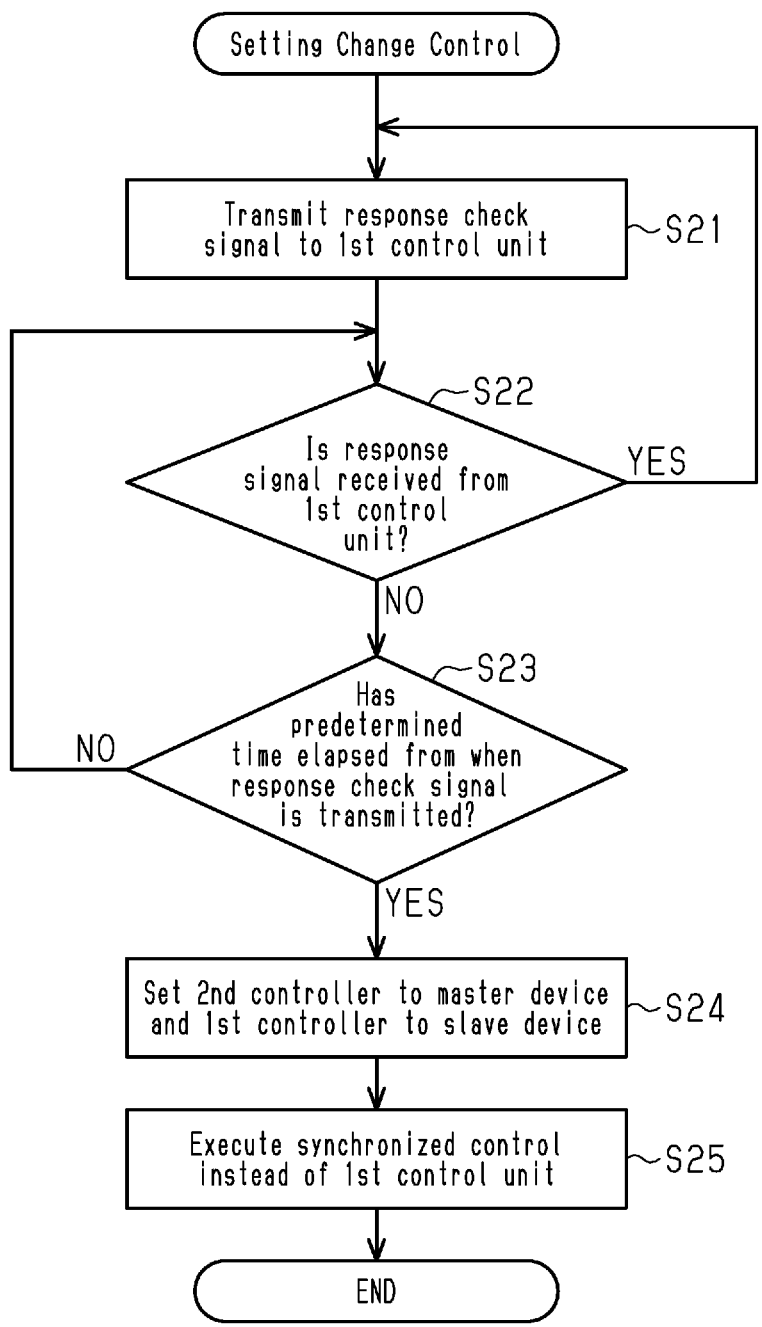
FIG. 7 is a flowchart showing the procedures of setting change control executed by a control unit.

The procedures of the setting change control will now be described with reference to FIG. 7. In the present embodiment, a case in which the second control unit 61 is changed from the slave control unit to the main control unit will be described.

In step S21, the second control unit 61 transmits a response check signal to the first control unit 51. In step S22, the second control unit 61 determines whether a response signal is received from the first control unit 51. When determining that the response signal is not received from the first control unit 51 (step S22: NO), the second control unit 61 proceeds to step S23 and determines whether a predetermined time has elapsed from when the response check signal is transmitted. The predetermined time is used to determine occurrence of an abnormality in transmission of a signal from the first control unit 51 and is set in advance through tests or the like.

When determining that the predetermined time has elapsed from when the response check signal is transmitted (step S23: YES), the second control unit 61 proceeds to step S24 and sets the second controller 60 to the master device and sets the first controller 50 to a slave device. In other words, the second control unit 61 is set to the main control unit, and the first control unit 51 is set to a slave control unit. In step S25, instead of the first control unit 51, the second control unit 61 executes synchronized control. In this case, the second control unit 61 operates the first controller 50 based on information (operating information) related to the operation of the first container 1A obtained before the first controller 50 malfunctions as the master device. More specifically, the second control unit 61 transmits operating information of the first container 1A obtained before the first controller 50 malfunctions as the master device, that is, the operating information of the first container 1A lastly received from the first controller 50, to the first controller 50. The first control unit 51 operates the refrigeration apparatus 20 of the first container 1A based on the operating information of the first container 1A received from the second control unit 61.

When determined that the predetermined time has not elapsed from when the response check signal is transmitted (step S23: NO), the second control unit 61 proceeds to step S22. When determining that the response signal is received from the first control unit 51 (step S22: YES), the second control unit 61 proceeds to step S21.

(b) Second Faulty Measure

Figure 8:
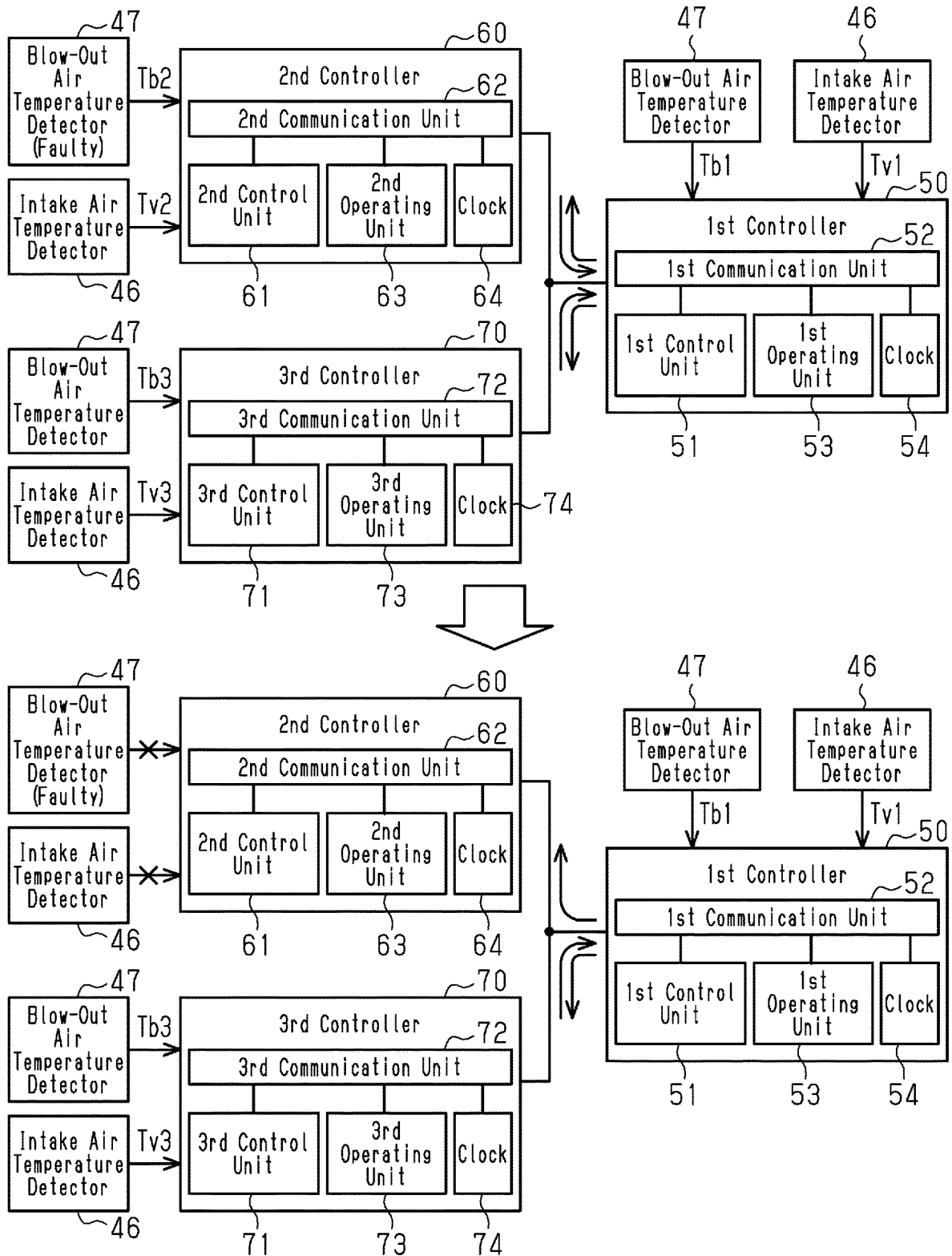
FIG. 8 is a block diagram showing a faulty measure taken when one of an intake air temperature detector and a blow-out air temperature detector of the refrigeration apparatus is faulty.

When executing the synchronized control, if at least one of the intake air temperature detector 46 or the blow-out air temperature detector 47 of one or more of the containers 1A to 1C is faulty, the one or more of the containers 1A to 1C may fail to perform various operations. This may result in a failure of execution of the synchronized control. In an example, as shown in the upper part of FIG. 8, when the blow-out air temperature detector 47 of the second container 1B is faulty, the second control unit 61 cannot obtain the blow-out air temperature Tb2 and thus may fail to start or end various operations of the second container 1B.

In this regard, in the refrigeration system 1 of the present embodiment, the containers 1A to 1C transmit operating information or the like to each other through the communication units 52, 62, and 72. More specifically, the first control unit 51 receives information related to the operation performed by the second control unit 61 and information related to the operation performed by the third control unit 71. The second control unit 61 receives information related to the operation performed by the first control unit 51 and information related to the operation performed by the third control unit 71. The third control unit 71 receives information related to the operation performed by the first control unit 51 and information related to the operation performed by the second control unit 61. Thus, the storage units of the control units 51, 61, and 71 store the information related to the operation performed by the first control unit 51, the information related to the operation performed by the second control unit 61, and the information related to the operation performed by the third control unit 71. Information related to operations performed by the control units 51, 61, and 71 includes the intake air temperatures Tv1 to Tv3, the blow-out air temperatures Tb1 to Tb3, the kind of operation performed by the control units 51, 61, and 71 (refrigerating-cooling operation and defrosting operation), operating frequencies of the compressors 21, rotational speeds of the exterior fans 23, rotational speeds of the interior fans 24, opening degrees of the expansion valves 27A and 27B, and opening degrees of the opening-closing valves 28A to 28D.

In the refrigeration system 1 of the present embodiment, when at least one of the intake air temperature detector 46 or the blow-out air temperature detector 47 of one or more of the containers 1A to 1C is faulty, the operation of the one or more of the containers 1A to 1C is controlled based on detection results of the intake air temperature detector 46 and the blow-out air temperature detector 47 of a remaining one of the containers 1A to 1C. For example, as shown in the lower part of FIG. 8, when the blow-out air temperature detector 47 of the second container 1B is faulty, substituted control is executed so that the second control unit 61 executes various operations based on the intake air temperature Tv1, which is the detection result of the intake air temperature detector 46 of the first container 1A, and the blow-out air temperature Tb1, which is the detection result of the blow-out air temperature detector 47 of the first container 1A. It is preferred that detection results of the intake air temperature detector 46 and the blow-out air temperature detector 47 of a container located adjacent to the faulty container be used in the substituted control.

The procedures of the substituted control will now be described with reference to FIGS. 9 and 10.

Figure 9:
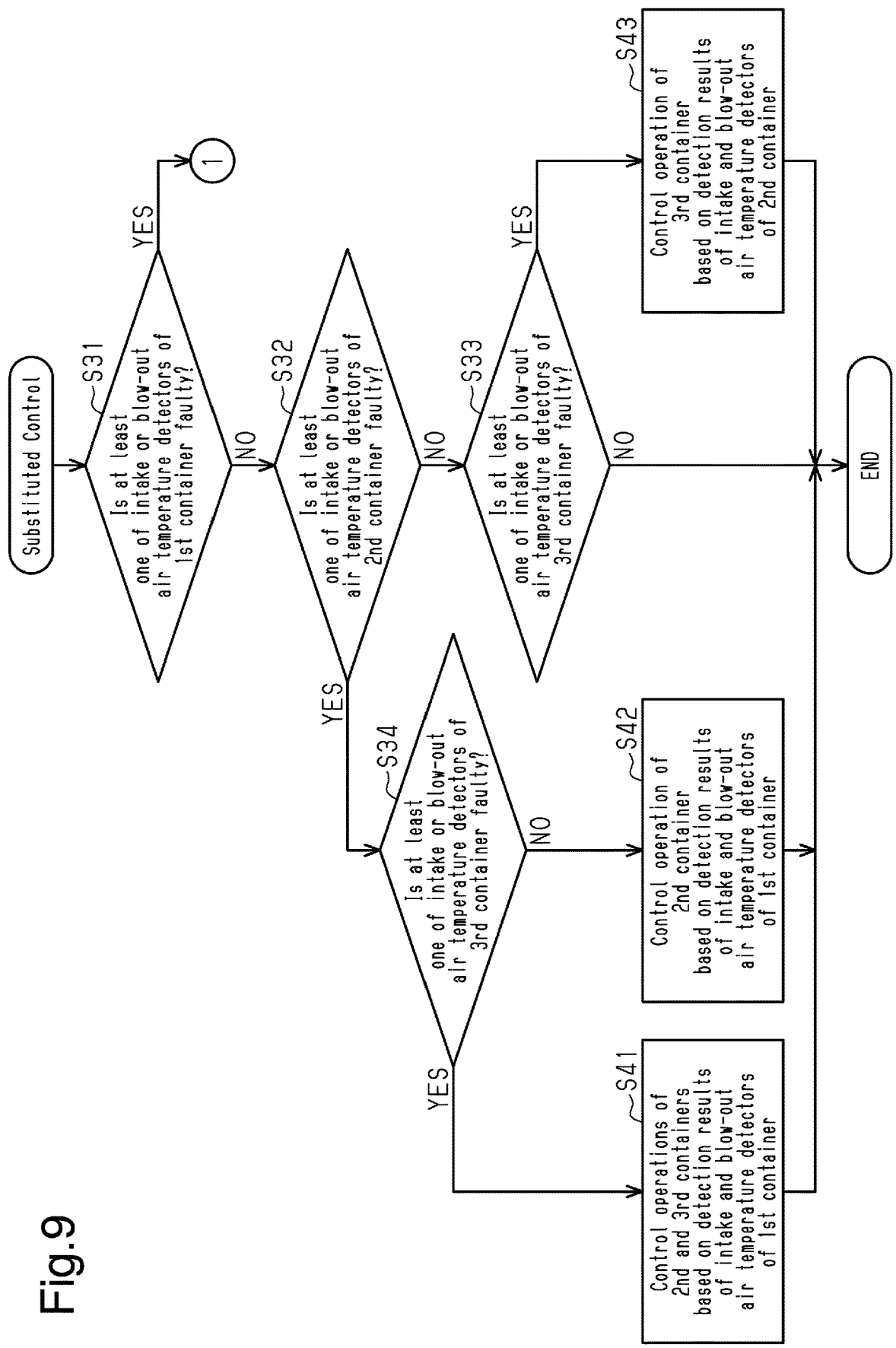
FIG. 9 is a flowchart showing the procedures of substituted control executed by the main control unit.

As shown in FIG. 9, in step S31, the first control unit 51 determines whether at least one of the intake air temperature detector 46 or the blow-out air temperature detector 47 of the first container 1A is faulty. More specifically, the first control unit 51 determines whether the intake air temperature detector 46 and the blow-out air temperature detector 47 of the first container 1A have each transmitted a detection signal to the first controller 50 in a predetermined period. When the detection signal has not been received from at least one of the intake air temperature detector 46 or the blow-out air temperature detector 47 in the predetermined period, the first control unit 51 determines that at least one of the intake air temperature detector 46 or the blow-out air temperature detector 47 is faulty.

When determining that neither the intake air temperature detector 46 nor the blow-out air temperature detector 47 of the first container 1A is faulty (step S31: NO), the first control unit 51 proceeds to step S32 and determines whether at least one of the intake air temperature detector 46 or the blow-out air temperature detector 47 of the second container 1B is faulty. More specifically, the second control unit 61 determines whether the intake air temperature detector 46 and the blow-out air temperature detector 47 of the second container 1B have each transmitted a detection signal to the second controller 60 in a predetermined period. This determination process is executed in the same manner as step S31. The second control unit 61 transmits the determination result to the first control unit 51.

When determining that neither the intake air temperature detector 46 nor the blow-out air temperature detector 47 of the second container 1B is faulty (step S32: NO), the first control unit 51 proceeds to step S33 and determines whether at least one of the intake air temperature detector 46 or the blow-out air temperature detector 47 of the third container 1C is faulty. More specifically, the third control unit 71 determines whether the intake air temperature detector 46 and the blow-out air temperature detector 47 of the third container 1C have each transmitted a detection signal to the third controller 70 in a predetermined period. This determination process is executed in the same manner as step S31. The third control unit 71 transmits the determination result to the first control unit 51.

When determining that neither the intake air temperature detector 46 nor the blow-out air temperature detector 47 of the third container 1C is faulty (step S33: NO), that is, when none of the intake air temperature detectors 46 and the blow-out air temperature detectors 47 of the containers 1A to 1C is faulty, the first control unit 51 temporarily ends the process.

When determining that at least one of the intake air temperature detector 46 or the blow-out air temperature detector 47 of the second container 1B is faulty (step S32: YES), the first control unit 51 proceeds to step S34 and determines whether at least one of the intake air temperature detector 46 or the blow-out air temperature detector 47 of the third container 1C is faulty. When determining that at least one of the intake air temperature detector 46 or the blow-out air temperature detector 47 of the third container 1C is faulty (step S34: YES), the first control unit 51 proceeds to step S41. More specifically, when an affirmative determination is made in step S34, the intake air temperature detector 46 and the blow-out air temperature detector 47 of the first container 1A are not faulty, and at least one of the intake air temperature detector 46 or the blow-out air temperature detector 47 of each of the second and third containers 1B and 1C is faulty. Therefore, in step S41, the first control unit 51 performs various operations of the second container 1B and the third container 1C based on the detection results of the intake air temperature detector 46 and the blow-out air temperature detector 47 of the first container 1A. When determining that neither the intake air temperature detector 46 nor the blow-out air temperature detector 47 of the third container 1C is faulty (step S34: NO), the first control unit 51 proceeds to step S42. More specifically, when a negative determination is made in step S34, neither the intake air temperature detectors 46 nor the blow-out air temperature detectors 47 of the first container 1A and the third container 1C are faulty, at least one of the intake air temperature detector 46 or the blow-out air temperature detector 47 of the second container 1B is faulty. Therefore, in step S42, the first control unit 51 performs various operations of the second container 1B based on the detection results of the intake air temperature detector 46 and the blow-out air temperature detector 47 of the first container 1A. In step S42, the first control unit 51 may perform various operations of the second container 1B based on the detection results of the intake air temperature detector 46 and the blow-out air temperature detector 47 of the third container 1C.

When determining in step S33 that at least one of the intake air temperature detector 46 or the blow-out air temperature detector 47 of the third container 1C is faulty (step S33: YES), the first control unit 51 proceeds to step S43. More specifically, when a negative determination is made in step S33, neither the intake air temperature detectors 46 nor the blow-out air temperature detectors 47 of the first container 1A and the second container 1B are faulty, and at least one of the intake air temperature detector 46 or the blow-out air temperature detector 47 of the third container 1C is faulty. Therefore, in step S43, the first control unit 51 controls various operations of the third container 1C based on the detection results of the intake air temperature detector 46 and the blow-out air temperature detector 47 of the second container 1B.

Figure 10:
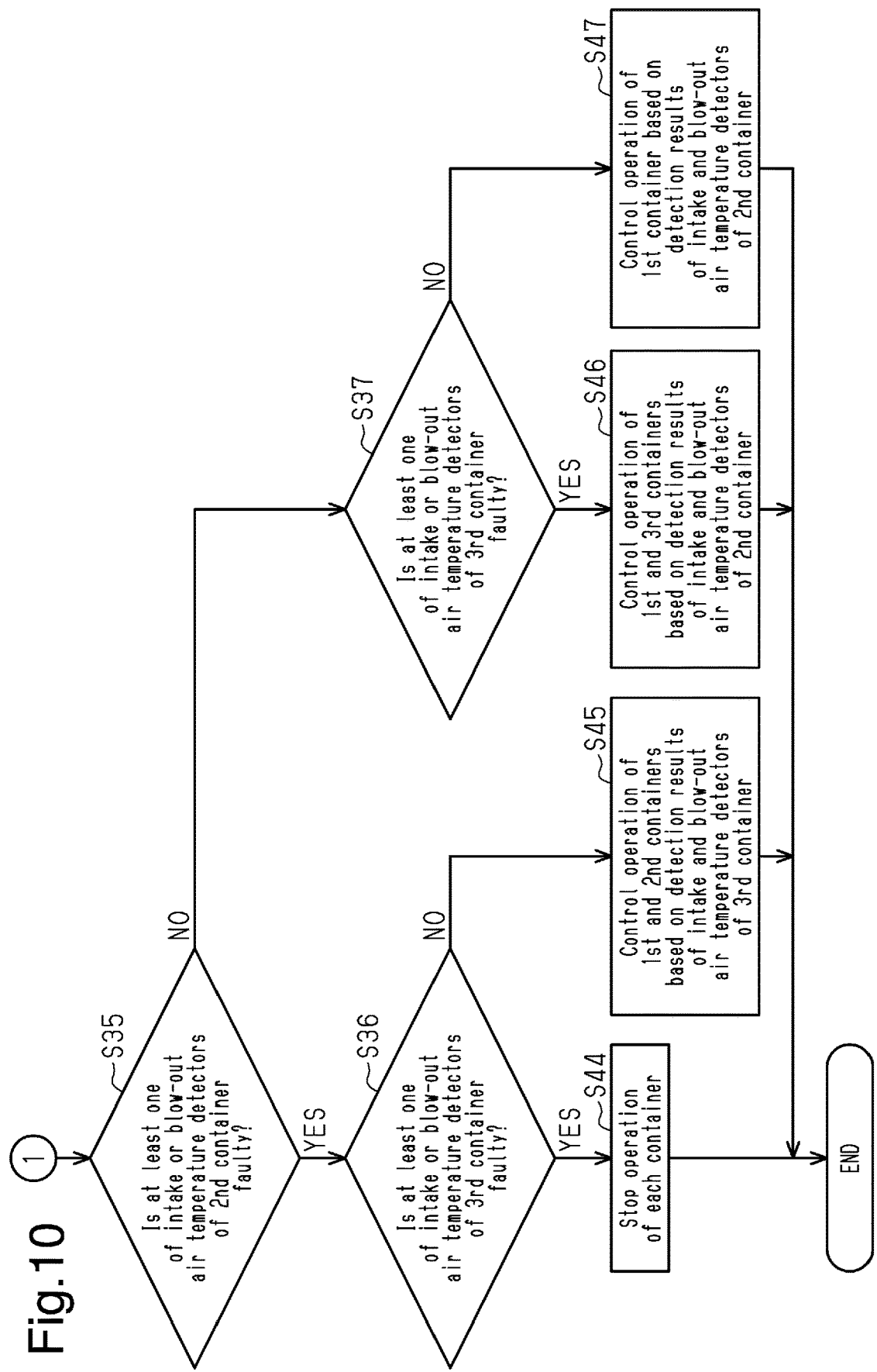
FIG. 10 is a flowchart showing the procedures of substituted control executed by the main control unit.

As shown in FIGS. 9 and 10, when an affirmative determination is made in step S31, the first control unit 51 proceeds to step S35 and determines whether at least one of the intake air temperature detector 46 or the blow-out air temperature detector 47 of the second container 1B is faulty. When determining that at least one of the intake air temperature detector 46 or the blow-out air temperature detector 47 of the second container 1B is faulty (step S35: YES), the first control unit 51 proceeds to step S36 and determines whether at least one of the intake air temperature detector 46 or the blow-out air temperature detector 47 of the third container 1C is faulty. When determining that at least one of the intake air temperature detector 46 or the blow-out air temperature detector 47 of the third container 1C is faulty (step S35: YES), the first control unit 51 proceeds to step S44. More specifically, when an affirmative determination is made in step S35, at least one of the intake air temperature detector 46 or the blow-out air temperature detector 47 of each of the containers 1A to 1C is faulty. In step S44, the first control unit 51 stops the operations of the containers 1A to 1C. In this case, the first control unit 51 may transmit a message indicating that the operations of the containers 1A to 1C are abnormal and have been stopped to, for example, a service center (control center) through the first communication unit 52.

When determining that neither the intake air temperature detector 46 nor the blow-out air temperature detector 47 of the third container 1C is faulty (step S36: NO), the first control unit 51 proceeds to step S45. More specifically, when a negative determination is made in step S36, at least one of the intake air temperature detector 46 or the blow-out air temperature detector 47 of each of the first and second containers 1A and 1B is faulty, and neither the intake air temperature detector 46 nor the blow-out air temperature detector 47 of the third container 1C is faulty. Therefore, in step S45, the first control unit 51 controls various operations of the first and second containers 1A and 1B based on the detection results of the intake air temperature detector 46 and the blow-out air temperature detector 47 of the third container 1C.

When determining in step S45 that neither the intake air temperature detector 46 nor the blow-out air temperature detector 47 of the second container 1B is faulty (step S35: NO), the first control unit 51 proceeds to step S37 and determines whether at least one of the intake air temperature detector 46 or the blow-out air temperature detector 47 of the third container 1C is faulty. When determining that at least one of the intake air temperature detector 46 or the blow-out air temperature detector 47 of the third container 1C is faulty (step S37: YES), the first control unit 51 proceeds to step S46. More specifically, when an affirmative determination is made in step S37, at least one of the intake air temperature detector 46 or the blow-out air temperature detector 47 of each of the first and third containers 1A and 1C is faulty, and neither the intake air temperature detector 46 nor the blow-out air temperature detector 47 of the second container 1B is faulty. Therefore, in step S46, the first control unit 51 controls various operations of the first and third containers 1A and 1C based on the detection results of the intake air temperature detector 46 and the blow-out air temperature detector 47 of the second container 1B.

When determining that neither the intake air temperature detector 46 nor the blow-out air temperature detector 47 of the third container 1C is faulty (step S37: NO), the first control unit 51 proceeds to step S47. More specifically, when a negative determination is made in step S37, at least one of the intake air temperature detector 46 or the blow-out air temperature detector 47 of the first container 1A is faulty, and neither the intake air temperature detector 46 nor the blow-out air temperature detector 47 of the second and third containers 1B and 1C is faulty. Therefore, in step S47, the first control unit 51 controls various operations of the first container 1A based on the detection results of the intake air temperature detector 46 and the blow-out air temperature detector 47 of the second container 1B.

Separated Control

The refrigeration apparatuses 20 of the containers 1A to 1C perform synchronized operation at a point in time of starting the refrigerating-cooling operation and change from the synchronized operation to separated operation after starting the refrigerating-cooling operation. In the separated operation, the refrigeration apparatuses 20 of the containers 1A to 1C separately perform the refrigerating-cooling operation on at separate storage set temperatures. More specifically, in the separated operation, the refrigeration apparatuses 20 of the containers 1A to 1C separately control, for example, the compressor 21, the interior fan 24, and the exterior fan 23 in accordance with the difference between the storage set temperature and the storage temperature of the corresponding container. The refrigeration apparatus 20 of the first container 1A calculates the storage temperature based on, for example, the intake air temperature Tv1. The refrigeration apparatus 20 of the second container 1B calculates the storage temperature based on, for example, the intake air temperature Tv2. The refrigeration apparatus 20 of the third container 1C calculates the storage temperature based on, for example, the intake air temperature Tv3.

When the refrigeration apparatuses 20 of the containers 1A to 1C change from the synchronized operation to the separated operation, for example, if the first control unit 51 is the main control unit and the second control unit 61 and the third control unit 71 are the slave control units in the synchronized operation, the first control unit 51 transmits an instruction signal for starting the separated operation to the second control unit 61 and the third control unit 71 through the first communication unit 52. When the instruction signal is received from the first control unit 51, the second control unit 61 starts the separated operation of the second container 1B. When the instruction signal is received from the first control unit 51, the third control unit 71 starts the separated operation of the third container 1C.

Setting Change Performed by Operator

Depending on the needs of the operator, the separated control, which separately operates the refrigeration apparatuses 20 of the containers 1A to 1C, may be executed without execution of the synchronized control. In the separated control, when the clock 54 of the first controller 50 reaches the scheduled start time of the defrosting operation, the first control unit 51 performs the defrosting operation of the first container 1A. When the clock 64 of the second controller 60 reaches the scheduled start time of the defrosting operation, the second control unit 61 performs the defrosting operation of the second container 1B. When the clock 75 of the third controller 70 reaches the scheduled start time of the defrosting operation, the third control unit 71 performs the defrosting operation of the third container 1C. That is, in the separated control, the control units 51, 61, and 71 separately control the containers 1A to 1C. In the separated control, when one or more of the containers 1A to 1C start the defrosting operation, the rest of the containers 1A to 1C do not start the defrosting operation based on the start of the defrosting operation of the one or more of the containers 1A to 1C.

The operator may select the separated control and the synchronized control by operating the operating units 53, 63, and 73. In addition, a first setting and a second setting may be selected. In the first setting, an operation performed on one of the operating units 53, 63, and 73 reflects operations of the remaining two operating units. In the second setting, an operation performed on one of the operating units 53, 63, and 73 does not reflect operations of the remaining two operating units. When the operating units 53, 63, and 73 are in the first setting and the operator selects the synchronized control using, for example, the first operating unit 53, the first communication unit 52 transmits information indicating that synchronized control is selected to the second controller 60 and the third controller 70. When the information is received from the first communication unit 52, the second controller 60 sets the second container 1B so that the second container 1B is controlled synchronously with the first container 1A and the third container 1C. When the information is received from the first communication unit 52, the third controller 70 sets the third container 1C so that the third container 1C is controlled synchronously with the first container 1A and the second container 1B. When the operating units 53, 63, and 73 are in the second setting, the operator operates each of the operating units 53, 63, and 73 to select, for example, the synchronized control. Accordingly, the controllers 50, 60, and 70 execute the synchronized control.

In addition, the operator may set the containers 1A to 1C to a container that is subject to the synchronized control. The operator may select a container that undergoes the synchronized control and a container that undergoes the separated control, for example, in accordance with the kind of load in the containers 1A to 1C. For example, when the first container 1A and the second container 1B store the same kind of loads and the third container 1C stores loads that differ in the kind from the loads of the first container 1A and the second container 1B, the synchronized control may be executed on the first container 1A and the second container 1B, and the separated control may be executed on the third container 1C.

In addition, the operator may set one of the controllers 50, 60, and 70 to the master device by operating the operating units 53, 63, and 73. In this case, among the controllers 50, 60, and 70, controllers other than the controller that is set to the master device are automatically set to the slave devices. More specifically, for example, when the operator operates the first operating unit 53 to set the first controller 50 to the master device, the first communication unit 52 transmits information indicating that the first controller 50 is the master device to the second controller 60 and the third controller 70. When the information is received from the first communication unit 52, the second controller 60 sets the second controller 60 to a slave device. When the information is received from the first communication unit 52, the third controller 70 sets the third controller 70 to a slave device.

The operation of the present embodiment will now be described.

The controllers 50, 60, and 70 send time information of the clock 54 of the master device and information related to operations of the containers 1A to 1C to each other. For example, when the clock 54 has reached a preset time (scheduled start time of defrosting operation) and the clocks 64 and 74 have not reached the scheduled start time, the first control unit 51 sends information indicating that the clock 54 has reached the scheduled start time to the second control unit 61 and the third control unit 71 through the first communication unit 52. The first control unit 51 transmits the defrosting start synchronization signal to the second control unit 61 and the third control unit 71 based on the information indicating that the clock 54 has reached the scheduled start time. As a result, the defrosting operations of the containers 1A to 1C synchronously start, thereby limiting separation between starts of the defrosting operations that would be caused by differences in the set time between the clocks 54, 64, and 74. This reduces situations in which the defrosting operations of the containers 1A to 1C separately start, causing some of the containers 1A to 1C to execute the refrigerating-cooling operation.

The present embodiment has the following advantages.

(1-1) The refrigeration system 1 includes the refrigeration apparatuses 20 installed on the containers 1A to 1C and the control units 51, 61, and 71 installed on the refrigeration apparatuses 20 of the containers 1A to 1C. The first control unit 51 is set to the main control unit among the control units 51, 61, and 71. When starting the defrosting operation under the synchronized control, the first control unit 51 synchronizes the refrigeration apparatuses 20. After the defrosting operation ends, when starting the refrigerating-cooling apparatus, the first control unit 51 synchronizes the refrigeration apparatuses 20. With this configuration, the refrigeration apparatuses 20 simultaneously or coordinately start each of the refrigerating-cooling operation and the defrosting operation. This avoids a situation in which one of the refrigeration apparatuses 20 performing the refrigerating-cooling operation coincides with one of the refrigeration apparatuses 20 performing the defrosting operation. Thus, variations in the operation of the refrigeration apparatuses 20 are limited.

(1-2) The controllers 50, 60, and 70 include the communication units 52, 62, and 72 that allow the controllers 50, 60, and 70 to communicate with each other. The first control unit 51 is set to the main control unit. The second control unit 61 and the third control unit 71 are set to the slave control units. The communication units 52, 62, and 72 allow the control units 51, 61, and 71 to communicate with each other. With this configuration, the controllers 50, 60, and 70 communicate with each other to control synchronization of the start of the refrigerating-cooling operation and synchronization of the start of the defrosting operation between the refrigeration apparatuses 20. Thus, variations in the operation of the refrigeration apparatuses 20 are limited.

(1-3) The first control unit 51 sends the time information of the clock 54 to the second control unit 61 and the third control unit 71 and synchronizes the refrigeration apparatuses 20 based on the time information of the clock 54 when starting the defrosting operation, and synchronizes the refrigeration apparatuses 20 when starting the refrigerating-cooling operation after the defrosting operation ends. With this configuration, synchronization of the start of the refrigerating-cooling operation and synchronization of the start of the defrosting operation between the refrigeration apparatuses 20 are controlled based on information of the single clock 54. Thus, variations in the operation of the refrigeration apparatuses 20 are limited.

(1-4) The first communication unit 52 of the first controller 50, which is the master device, and the second communication unit 62 of the second controller 60 and the third communication unit 72 of the third controller 70, which are the slave devices, send operating information of the master device and operating information of the slave devices to each other. When the master device malfunctions as the master device, the second control unit 61 of the second controller 60 synchronizes the master device with the slave devices and operates the master device based on operating information of the master device before malfunctioning as the master device. With this configuration, when the master device malfunctions as the master device, the slave control unit (second control unit 61) of the slave device controls the master device. Thus, variations in the operation of the refrigeration apparatuses 20 are limited, and the master device may continue to operate.

(1-5) The operating units 53, 63, and 73 of the controllers 50, 60, and 70 are operated to perform the setting of the master device and the slave devices and the setting of the synchronized control, which synchronously operates the refrigeration apparatuses 20, and the separated control, which separately operates the refrigeration apparatuses 20. With this configuration, the setting of control that synchronously operates the refrigeration apparatuses 20 and control that separately operates the refrigeration apparatuses 20 and the setting of the master device and the slave devices may be manually performed by the operator operating the operating units 53, 63, and 73.

(1-6) Each of the containers 1A to 1C includes the blow-out air temperature detector 47 and the intake air temperature detector 46. The controllers 50, 60, and 70 send information related to detection results of the blow-out air temperature detectors 47 and information related to detection results of the intake air temperature detectors 46 of the refrigeration apparatuses 20 to each other through the communication units 52, 62, and 72. When the blow-out air temperature detector 47 or the intake air temperature detector 46 of one of the refrigeration apparatuses 20 is faulty, the control unit of the one of the refrigeration apparatuses 20 operates the one of the refrigeration apparatus 20 based on information related to detection results of the blow-out air temperature detector 47 and the intake air temperature detector 46 of another one of the refrigeration apparatuses 20. With this configuration, even when the blow-out air temperature detector 47 or the intake air temperature detector 46 of one of the refrigeration apparatuses 20 is faulty, the one of the refrigeration apparatuses 20 may continue to operate using information related to a detection result of the blow-out air temperature detector 47 and information related to a detection result of the intake air temperature detector 46 of another one of the refrigeration apparatuses 20.

(1-7) In the synchronized control, when one of the containers 1A to 1C starts the defrosting operation, the first control unit 51 transmits the information to the controllers of the other containers so that the remaining refrigeration apparatuses 20 synchronously start the defrosting operation. With this configuration, synchronization of the start of the defrosting operation between the refrigeration apparatuses 20 is controlled using information indicating that one of the refrigeration apparatuses 20 has started the defrosting operation. Thus, variations in the defrosting operation of the refrigeration apparatuses 20 are limited.

(1-8) In the synchronized control, when one of the containers 1A to 1C starts the refrigerating-cooling operation, the first control unit 51 sends the information to the controllers of the other containers to synchronize the remaining refrigeration apparatuses 20 to start the refrigerating-cooling operation. With this configuration, synchronization of the start of the refrigerating-cooling operation between the refrigeration apparatuses 20 is controlled through the information indicating that the one of the refrigeration apparatuses 20 has started the refrigerating-cooling operation. Thus, variations in the refrigerating-cooling operation of the refrigeration apparatuses 20 are limited.

Second Embodiment

Figure 11:
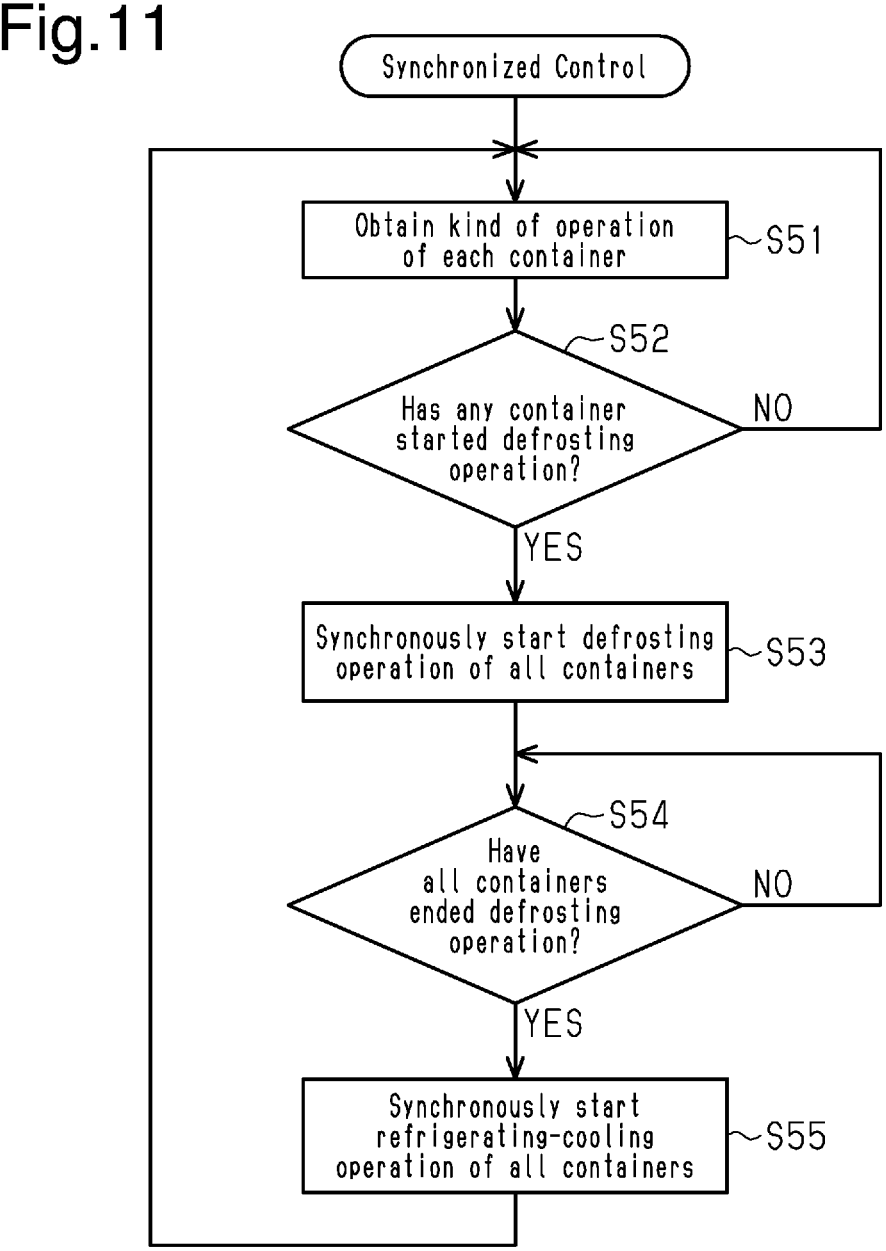
FIG. 11 is a flowchart showing the procedures of synchronized control executed by a main control unit in a second embodiment of a refrigeration system.

A second embodiment of a refrigeration system 1 will now be described with reference to FIG. 11. The refrigeration system 1 of the present embodiment differs from the refrigeration system 1 of the first embodiment in synchronized control. In the following description, the same reference numerals are given to those elements that are the same as the corresponding elements of the refrigeration system 1 of the first embodiment. Such elements will not be described in detail.

The containers 1A to 1C of the present embodiment perform the defrosting operation based on the amount of frost collected on the evaporator 25 and the difference (Tv1-Tb1, Tv2-Tb2, Tv3-Tb3) between the intake air temperature and the blow-out air temperature of the respective containers 1A to 1C. If the containers 1A to 1C are separately controlled, the amount of frost collected on the evaporator 25 varies between the containers 1A to 1C. This may produce a state in which one or more of the containers 1A to 1C perform the defrosting operation and the rest of the containers 1A to 1C perform the refrigerating-cooling operation. In such a case, termination of the defrosting operation of the one or more of the containers 1A to 1C is hindered. In addition, the refrigerating-cooling operation of the remaining containers 1A to 1C may overcool in the same manner as the first embodiment.

In addition, when the containers 1A to 1C are performing the defrosting operation, if one or more of the containers 1A to 1C end the defrosting operation and resume the refrigerating-cooling operation, the one or more of the containers 1A to 1C perform the refrigerating-cooling operation while the rest of the containers 1A to 1C perform the defrosting operation. This also may hinder termination of the defrosting operation and locally overcool a space where the refrigerating-cooling operation is performed.

In the same manner as the refrigeration system 1 of the first embodiment, the refrigeration system 1 of the present embodiment executes the synchronized control, in which information related to the operations performed by the control units 51, 61, and 71 is obtained, when one of the containers 1A to 1C has started the defrosting operation, the remaining containers start the defrosting operation, and when one of the containers 1A to 1C has started the refrigerating-cooling operation, the remaining containers start the refrigerating-cooling operation. Also, in the present embodiment, the first controller 50 is set to the master device, and the second controller 60 and the third controller 70 are set to the slave devices.

The first control unit 51 used as the main control unit executes the synchronized control. The procedures of the synchronized control will now be described with reference to the flowchart shown in FIG. 11. The first control unit 51 executes the synchronized control during a period from when the containers 1A to 1C start to operate to when the containers 1A to 1C stops operating.

In step S51, the first control unit 51 obtains the kind of operation of each of the containers 1A to 1C. In step S52, the first control unit 51 determines whether any of the containers 1A to 1C has started the defrosting operation. More specifically, the first control unit 51, the second control unit 61, and the third control unit 71 send information indicating that the control units 51, 61, and 71 of the containers 1A to 1C have started the defrosting operation through the communication units 52, 62, and 72. More specifically, when the first container 1A has started the defrosting operation, the first control unit 51 transmits a defrosting operation start signal to the second control unit 61 and the third control unit 71. When the second container 1B has started the defrosting operation, the second control unit 61 transmits a defrosting operation start signal to the first control unit 51 and the third control unit 71. When the third container 1C has started the defrosting operation, the third control unit 71 transmits a defrosting operation start signal to the first control unit 51 and the second control unit 61. When the first control unit 51 transmits the defrosting operation start signal, the first control unit 51 determines that the first container 1A has started the defrosting operation. When the defrosting operation start signal is received from the second control unit 61, the first control unit 51 determines that the second container 1B has started the defrosting operation. When the defrosting operation start signal is received from the third control unit 71, the first control unit 51 determines that the third container 1C has started the defrosting operation.

When the first control unit 51 determines that any of the containers 1A to 1C has not started the defrosting operation (step S52: NO), the first control unit 51 proceeds to step S11. When the first control unit 51 determines that one of the containers 1A to 1C has started the defrosting operation (step S52: YES), the first control unit 51 proceeds to step S53 and synchronizes all of the containers 1A to 1C to start the defrosting operation. More specifically, when the first container 1A has started the defrosting operation, the second control unit 61 starts the defrosting operation of the second container 1B when receiving the defrosting operation start signal from the first control unit 51, and the third control unit 71 starts the defrosting operation of the third container 1C when receiving the defrosting operation start signal from the first control unit 51. When the second container 1B has started the defrosting operation, the first control unit 51 starts the defrosting operation of the first container 1A when receiving the defrosting operation start signal from the second control unit 61, and the third control unit 71 starts the defrosting operation of the third container 1C when receiving the defrosting operation start signal from the second control unit 61. When the third container 1C has started the defrosting operation, the first control unit 51 starts the defrosting operation of the first container 1A when receiving the defrosting operation start signal from the third control unit 71, and the second control unit 61 starts the defrosting operation of the second container 1B when receiving the defrosting operation start signal from the third control unit 71.

In step S54, the first control unit 51 determines whether all of the containers 1A to 1C have ended the defrosting operations. More specifically, the first control unit 51, the second control unit 61, and the third control unit 71 send information indicating that the control units 51, 61, and 71 of the containers 1A to 1C have ended the defrosting operations through the communication units 52, 62, and 72. More specifically, when the first container 1A has end the defrosting operation, the first control unit 51 transmits a defrosting operation end signal to the second control unit 61 and the third control unit 71. When the second container 1B has ended the defrosting operation, the second control unit 61 transmits a defrosting operation end signal to the first control unit 51 and the third control unit 71. When the third container 1C has ended the defrosting operation, the third control unit 71 transmits a defrosting operation end signal to the first control unit 51 and the second control unit 61. When the first control unit 51 transmits the defrosting operation end signal, the first control unit 51 determines that the first container 1A has ended the defrosting operation. Also, the first control unit 51 determines that the second container 1B has ended the defrosting operation when receiving the defrosting operation end signal from the second control unit 61, and determines that the third container 1C has ended the defrosting operation when receiving the defrosting operation end signal from the third control unit 71.

When determining that all of the containers 1A to 1C have not ended the defrosting operation (step S54: NO), the first control unit 51 again proceeds to the determination of step S54. In an example, when the first container 1A has ended the defrosting operation and the second container 1B and the third container 1C have not ended the defrosting operation, the operation of the first container 1A is stopped, and the second container 1B and the third container 1C continue the defrosting operation. Then, when the second container 1B has ended the defrosting operation and the third container 1C has not ended the defrosting operation, the operation of the first container 1A continues to be stopped, the operation of the second container 1B is stopped, and the third container 1C continues the defrosting operation.

When determining that all of the containers 1A to 1C have ended the defrosting operations (step S54: YES), the first control unit 51 proceeds to step S55 and synchronizes all of the containers 1A to 1C to start the refrigerating-cooling operation. More specifically, the first control unit 51 transmits the refrigerating-cooling start synchronization signal to the second control unit 61 and the third control unit 71 through the first communication unit 52. Thus, the start of the refrigerating-cooling operation is synchronized between the containers 1A to 1C. More specifically, after transmitting the refrigerating-cooling start synchronization signal to the second control unit 61 and the third control unit 71, the first control unit 51 performs the refrigerating-cooling operation of the first container 1A. When receiving the refrigerating-cooling start synchronization signal, the second control unit 61 performs the refrigerating-cooling operation of the second container 1B. When receiving the refrigerating-cooling start synchronization signal, the third control unit 71 performs the refrigerating-cooling operation of the third container 1C. Then, the process returns to step S51.

The operation of the present embodiment will now be described.

For example, when the first container 1A has started the defrosting operation, the first control unit 51 transmits the defrosting operation start signal to the second control unit 61 and the third control unit 71. The second control unit 61 and the third control unit 71 start the defrosting operations of the second container 1B and the third container 1C based on the defrosting operation start signal. As described above, the second and third containers 1B and 1C start the defrosting operations in cooperation with the start of the defrosting operation of the first container 1A. Also, in this case, the containers 1A to 1C synchronously start the defrosting operation. This reduces situations in which the defrosting operations of the containers 1A to 1C separately start, causing some of the containers 1A to 1C to execute the refrigerating-cooling operation. The present embodiment has the same advantages as the first embodiment.

Third Embodiment

Figure 12:
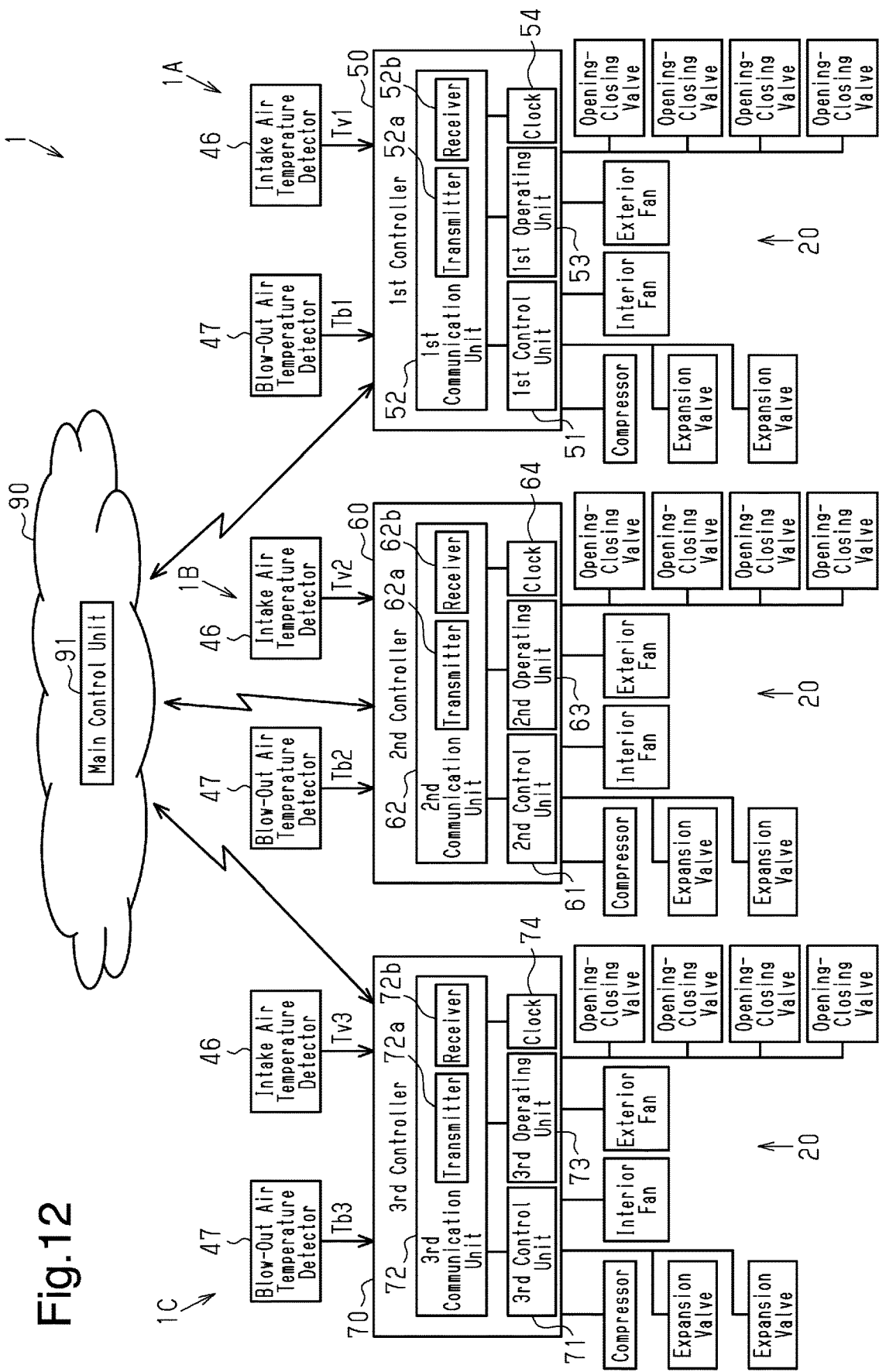
FIG. 12 is a block diagram showing the electrical configuration of a third embodiment of a refrigeration system.

A third embodiment of a refrigeration system 1 will now be described with reference to FIG. 12. The refrigeration system 1 of the present embodiment differs from the refrigeration system 1 of the first embodiment in the communication mode of the controllers 50, 60, and 70. In the following description, the same reference numerals are given to those elements that are the same as the corresponding elements of the refrigeration system 1 of the first embodiment. Such elements will not be described in detail.

The first communication unit 52 of the first controller 50, the second communication unit 62 of the second controller 60, and the third communication unit 72 of the third controller 70 are configured to perform wireless communication with an external server 90. An example of the server 90 is a cloud server. The server 90 includes a main control unit 91. The main control unit 91 includes, for example, an arithmetic processing unit that executes a predetermined control program and a storage unit.

The communication units 52, 62, and 72 transmit the times of the clocks 54, 64, and 74 and information related to operations performed by the control units 51, 61, and 71 to the main control unit 91. The main control unit 91 stores the times of the clocks 54, 64, and 74 and the information related to operations performed by the control units 51, 61, and 71. Information related to operations performed by the control units 51, 61, and 71 includes the intake air temperatures Tv1 to Tv3, the blow-out air temperatures Tb1 to Tb3, the kind of operation performed by the control units 51, 61, and 71 (refrigerating-cooling operation and defrosting operation), operating frequencies of the compressors 21, rotational speeds of the exterior fans 23, rotational speeds of the interior fans 24, opening degrees of the expansion valves 27A and 27B, and opening degrees of the opening-closing valves 28A to 28D.

The main control unit 91 transmits control signals related to operations of the containers 1A to 1C to the communication units 52, 62, and 72 based on the times of the clocks 54, 64, and 74 and the information related to operations performed by the control units 51, 61, and 71. The control units 51, 61, and 71 control operations of the respective containers 1A to 1C based on the control signals of the main control unit 91. That is, the control units 51, 61, and 71 are slave control units of the main control unit 91.

More specifically, the main control unit 91 executes various controls such as the synchronized control and the substituted control on the containers 1A to 1C. In the synchronized control, the main control unit 91 transmits the defrosting start synchronization signal, the defrosting end synchronization signal, and the refrigerating-cooling start synchronization signal to the communication units 52, 62, and 72 in the same manner as in the synchronized control of the first embodiment. The communication units 52, 62, and 72 transmit the defrosting start synchronization signal, the defrosting end synchronization signal, and the refrigerating-cooling start synchronization signal to the control units 51, 61, and 71. In the substituted control, the communication units 52, 62, and 72 transmit determination results indicating whether at least one of the intake air temperature detectors 46 or the blow-out air temperature detectors 47 of the containers 1A to 1C is faulty to the main control unit 91. The main control unit 91 controls the operations of the containers 1A to 1C based on the determination results received from the communication units 52, 62, and 72 in the same manner as in the substituted control of the first embodiment.

The present embodiment has the following advantages.

(3-1) The communication units 52, 62, and 72 of the refrigeration apparatuses 20 of the containers 1A to 1C are configured to be connected to the server 90. With this configuration, synchronization of the start of the refrigerating-cooling operation and synchronization of the start of the defrosting operation between the refrigeration apparatuses 20 are controlled through the main control unit 91 of the server 90, which may be a cloud-based server. Thus, variations in the operation of the refrigeration apparatuses 20 are limited.

Fourth Embodiment

Figure 13:
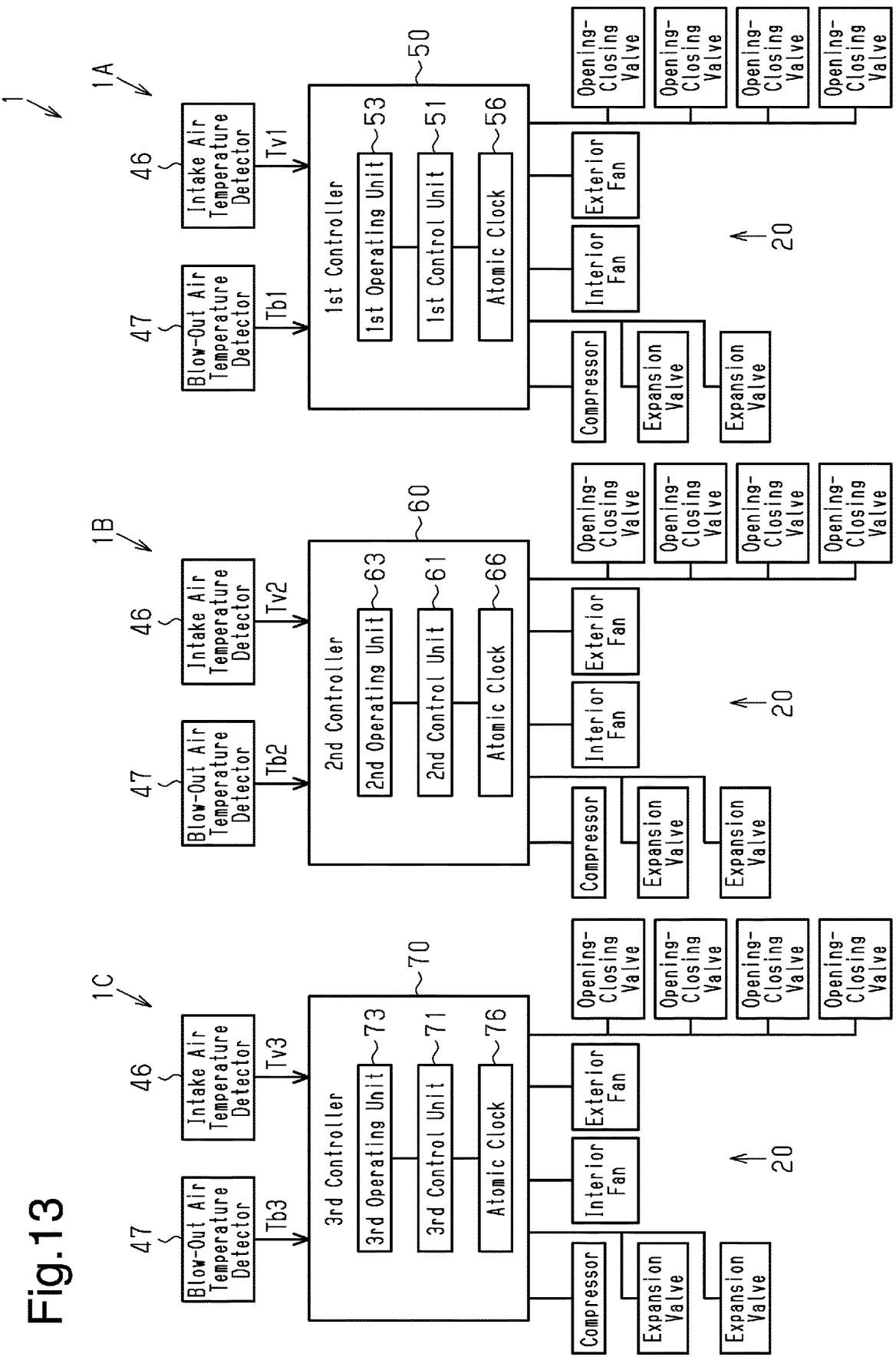
FIG. 13 is a block diagram showing the electrical configuration of a refrigeration system of a fourth embodiment.

A fourth embodiment of a refrigeration system 1 will now be described with reference to FIG. 13. The refrigeration system 1 of the present embodiment differs in the configurations of the controllers 50, 60, and 70. In the following description, the same reference numerals are given to those elements that are the same as the corresponding elements of the refrigeration system 1 of the first embodiment. Such elements will not be described in detail.

The controllers 50, 60, and 70 of the present embodiment include atomic clocks 56, 66, and 76 instead of the clocks 54, 64, and 74. The time of the atomic clock 56 is transmitted to the first control unit 51. The time of the atomic clock 66 is transmitted to the second control unit 61. The time of the atomic clock 76 is transmitted to the third control unit 71.

The control units 51, 61, and 71 of the present embodiment start the defrosting operation at a preset first start time (scheduled start time of defrosting operation) and end the defrosting operation at a preset first end time (scheduled end time of defrosting operation). More specifically, when determining that the atomic clock 56 has reached the scheduled start time of the defrosting operation, the first control unit 51 starts the defrosting operation. When determining that the atomic clock 56 has reached the scheduled end time of the defrosting operation, the first control unit 51 ends the defrosting operation. When determining that the atomic clock 66 has reached the scheduled start time of the defrosting operation, the second control unit 61 starts the defrosting operation. When determining that the atomic clock 66 has reached the scheduled end time of the defrosting operation, the second control unit 61 ends the defrosting operation. When determining that the atomic clock 76 has reached the scheduled start time of the defrosting operation, the third control unit 71 starts the defrosting operation. When determining that the atomic clock 76 has reached the scheduled end time of the defrosting operation, the third control unit 71 ends the defrosting operation. As described above, the control units 51, 61, and 71 of the present embodiment separately control the starting and ending of the defrosting operation.

In addition, the control units 51, 61, and 71 start the refrigerating-cooling operation at a preset second start time (scheduled start time of refrigerating-cooling operation) and end the refrigerating-cooling operation at a preset second end time (scheduled end time of refrigerating-cooling operation). More specifically, when determining that the atomic clock 56 has reached the scheduled start time of the refrigerating-cooling operation, the first control unit 51 performs the refrigerating-cooling operation. When determining that the atomic clock 56 has reached the scheduled end time of the refrigerating-cooling operation, the first control unit 51 ends the refrigerating-cooling operation. When determining that the atomic clock 66 has reached the scheduled start time of the refrigerating-cooling operation, the second control unit 61 performs the refrigerating-cooling operation. When determining that the atomic clock 66 has reached the scheduled end time of the refrigerating-cooling operation, the second control unit 61 ends the refrigerating-cooling operation. When determining that the atomic clock 76 has reached the scheduled start time of the refrigerating-cooling operation, the third control unit 71 performs the refrigerating-cooling operation. When determining that the atomic clock 76 has reached the scheduled end time of the refrigerating-cooling operation, the third control unit 71 ends the refrigerating-cooling operation. In the present embodiment, a defrosting period (period from the scheduled start time of the defrosting operation to the scheduled end time of the defrosting operation) and a refrigerating-cooling period (period from the scheduled start time of the refrigerating-cooling operation to the scheduled end time of the refrigerating-cooling operation) are set so that the defrosting period does not overlap with the refrigerating-cooling period.

Each of the control units 51, 61, and 71 of the present embodiment may set the first start time to a time after a first predetermined time elapses from the second start time, which is the scheduled start time of the refrigerating-cooling operation. In addition, each of the control units 51, 61, and 71 may set the first end time, which is the scheduled end time of the defrosting operation, to a time after a second predetermined time elapses from the first start time, and may set a third start time, that is, a resuming time of the refrigerating-cooling operation, to a time after a third predetermined time elapses from the first end time. As described above, the control units 51, 61, and 71 may use the atomic clocks 56, 66, and 76 to interrupt the refrigerating-cooling operation and perform the defrosting operation. In addition, multiple first start times and multiple first end times may be set so that the refrigerating-cooling operation is interrupted with the defrosting operation a number of times. The first predetermined time, the second predetermined time, and the third predetermined time may be set in any manner. In an example, the second predetermined time is shorter than the first predetermined time, and the third predetermined time is shorter than the second predetermined time. In an example, the third predetermined time may be set to zero seconds so that the refrigerating-cooling operation is resumed immediately after the defrosting operation ends.

The present embodiment has the following advantages.

(4-1) The control units 51, 61, and 71 start the defrosting operation or the refrigerating-cooling operation based on the times of the atomic clocks 56, 66, and 76 mounted on the refrigeration apparatuses 20 of the containers 1A to 1C. With this configuration, information of the atomic clocks 56, 66, and 76 mounted on the refrigeration apparatuses 20 of the containers 1A to 1C is used to control start of the refrigerating-cooling operation and start of the defrosting operation of the refrigeration apparatuses 20. As a result, the refrigeration apparatuses 20 synchronously start the refrigerating-cooling operation, and the refrigeration apparatuses 20 synchronously start the defrosting operation. Thus, variations in the operation of the refrigeration apparatuses 20 are limited.

Modified Examples

The above embodiments exemplify, without any intention to limit, applicable forms of a refrigeration system according to the present disclosure. In addition to the embodiments described above, the refrigeration system is applicable to, for example, modified examples of the above embodiments that are described below and combinations of at least two of the modified examples that do not contradict each other. In the following modified examples, the same reference numerals are given to those elements that are the same as the corresponding elements of the above embodiments. Such elements will not be described in detail.

Figure 14:
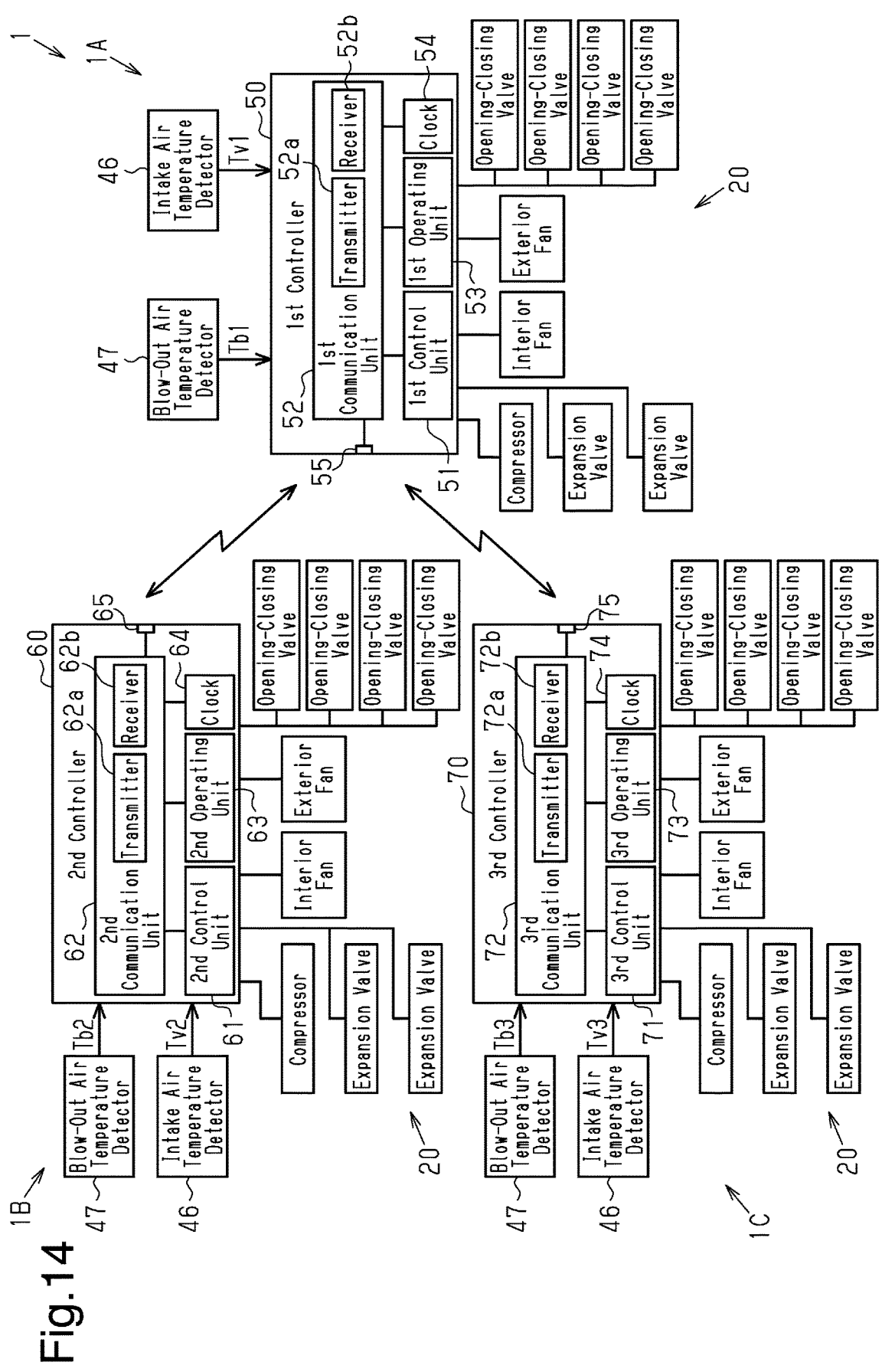
FIG. 14 is a block diagram showing the electrical configuration of a refrigeration system of a modified example.

In the first embodiment, as shown in FIG. 14, the first communication unit 52 of the first controller 50, the second communication unit 62 of the second controller 60, and the third communication unit 72 of the third controller 70 may be configured to perform wireless communication with each other. In this configuration, the communication line 80 is omitted. The communication units 52, 62, and 72 that are configured to perform wireless communication with each other are, for example, a universal serial bus (USB) adapter configured to perform wireless communication such as a Wi-Fi (wireless LAN) slave device. The USB adapter is connected to each of the communication ports 55, 65, and 75.

In the synchronized control of the second embodiment, when the first container 1A starts the defrosting operation, the first control unit 51 may transmit the defrosting start synchronization signal to the second control unit 61 and the third control unit 71 through the first communication unit 52. Alternatively, when the defrosting operation start signal is received from the second control unit 61 or the third control unit 71, the first control unit 51 may transmit the defrosting start synchronization signal to the second control unit 61 and the third control unit 71 through the first communication unit 52. As described above, the first control unit 51 transmits the defrosting start synchronization signal, instead of the defrosting operation start signal, to the second control unit 61 and the third control unit 71 to synchronously start the defrosting operation of the containers 1A to 1C.

In the third embodiment, when the main control unit 91 executes the synchronized control, the defrosting operation or the refrigerating-cooling operation may be started based on a clock (e.g., clock in the cloud) of the server 90. With this configuration, information of the clock of the server 90 is used to control start of the refrigerating-cooling operation and start of the defrosting operation of the refrigeration apparatuses 20. As a result, the refrigeration apparatuses 20 synchronously start the refrigerating-cooling operation, and the refrigeration apparatuses 20 synchronously start the defrosting operation. Thus, variations in the operation of the refrigeration apparatuses 20 are limited.

In the fourth embodiment, the first communication unit 52 may be added to the first controller 50, the second communication unit 62 may be added to the second controller 60, and the third communication unit 72 may be added to the third controller 70. In this case, the controllers 50, 60, and 70 may send information related to operations performed by the containers 1A to 1C to each other.

In the first and third embodiments, the refrigeration system 1 may control the refrigeration apparatuses 20 of the containers 1A to 1C so that in the refrigeration apparatuses 20 of the containers 1A to 1C, a refrigeration apparatus 20 performing the defrosting operation coincides with a refrigeration apparatus 20 performing an operation other than the defrosting operation. More specifically, in the separated operation of the refrigeration system 1, one of the refrigeration apparatuses 20 performing the defrosting operation may coincide with one of the refrigeration apparatuses 20 performing an operation other than the defrosting operation (e.g., refrigerating-cooling operation). In this case, the refrigeration system 1 determines whether to perform the defrosting operation based on, for example, the amount of frost collected on the evaporators 25 and the differences (Tv1-Tb1, Tv2-Tb2, Tv3-Tb3) between the intake air temperature and the blow-out air temperature of the containers 1A to 1C.

In each embodiment, in the separated operation of the containers 1A to 1C, the refrigeration system 1 may decrease cooling power of the refrigeration apparatus 20 corresponding to a location where the storage temperature is relatively low and increase cooling power of the refrigeration apparatus 20 corresponding to a location where the storage temperature is relatively high. The refrigeration system 1 controls the refrigerating-cooling operation of the refrigeration apparatuses 20 of the containers 1A to 1C so that the storage temperatures of the containers 1A to 1C reach the medium one of the storage temperatures of the containers 1A to 1C. In an example, when the storage temperature of the first container 1A is the lowest, the storage temperature of the third container 1C is the highest, and the storage temperature of the second container 1B is higher than the storage temperature of the first container 1A and lower than the storage temperature of the third container 1C, the refrigeration system 1 sets the storage set temperature to the storage temperature of the second container 1B. Thus, the refrigeration system 1 decreases cooling power of the refrigeration apparatus 20 of the first container 1A having the low storage temperature and increases cooling power of the refrigeration apparatus 20 of the third container 1C having the high storage temperature.

When the master device malfunctions as the master device, the setting change control of each embodiment may synchronize the master device with the slave devices and control the master device having the malfunction based on operating information of the slave devices. More specifically, when the first controller 50 used as the master device malfunctions as the master device, the second control unit 61 synchronizes with the first controller 50 and operates the first controller 50 based on information (operating information) related to the operation of the second container 1B. Instead of the second control unit 61, the third control unit 71 may synchronize with the first controller 50 and operate the first controller 50 based on information (operating information) related to the operation of the second container 1B.

Figure 15:
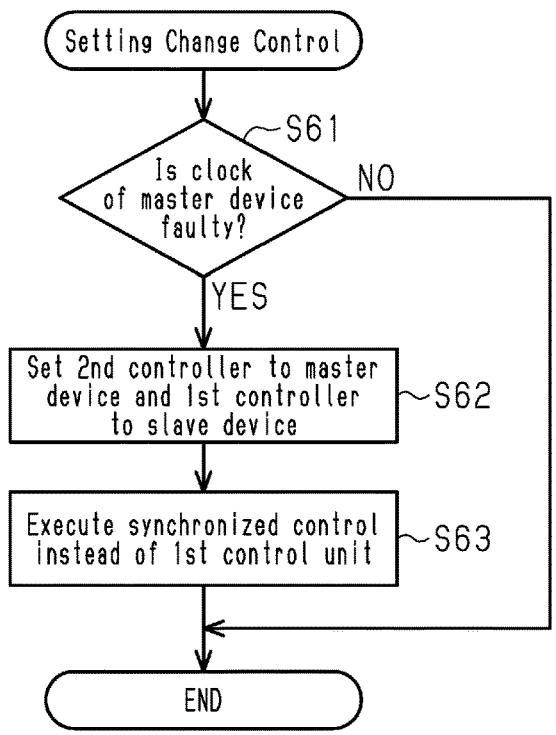
FIG. 15 is a flowchart showing the procedures of synchronized control executed by a main control unit in another modified example of a refrigeration system.

In the setting change control of each embodiment, a case in which the master device malfunctions as the master device includes a case in which the clock 54 of the master device (first controller 50) is faulty. In this case, one of the slave devices having a non-faulty clock is changed to the master device, and the master device (first controller 50) is changed to a slave device. The new master device executes synchronized control based on the non-faulty clock. The specific procedures are shown in the flowchart of the setting change control in FIG. 15. In step S61, the second control unit 61 determines whether the clock 54 of the master device is faulty. When determining that the clock 54 of the master device is not faulty (step S61: NO), the second control unit 61 temporarily ends the process. When determining that the clock 54 of the master device is faulty (step S61: YES), the second control unit 61 proceeds to step S62 and sets the second controller 60 to the master device and sets the first controller 50 to a slave device. In step S63, instead of the first control unit 51, the second control unit 61 executes the synchronized control. Synchronized control executed by the second control unit 61 is executed based on the clock 64 of the second controller 60. The setting change control of this modified example may be combined and executed with the setting change control of each embodiment.

In the setting change control of the embodiments and the modified example, when the master device malfunctions as the master device, the container having the malfunctioning master device may be operated based on information of the operation of a container located adjacent to the container having the new master device.

In the setting change control of the embodiments and the modified example, when the master device malfunctions as the master device, if the intake air temperature detector 46 and the blow-out air temperature detector 47 are not faulty, the container having the malfunctioning master device may control the operation based on the operating information of the container. In this case, the control unit of the container that is newly set to the master device transmits the defrosting start synchronization signal, the defrosting end synchronization signal, and the refrigerating-cooling start synchronization signal to the control unit of the container having the malfunctioning master device so that the containers 1A to 1C synchronize with each other.

In each embodiment, the operating units 53, 63, and 73 of the controllers 50, 60, and 70 may be configured to perform only one of the setting of the master device and the slave devices and the setting of the synchronized control, which synchronously operates the refrigeration apparatuses 20, and the separated control, which separately operates the refrigeration apparatuses 20.

Figure 16:
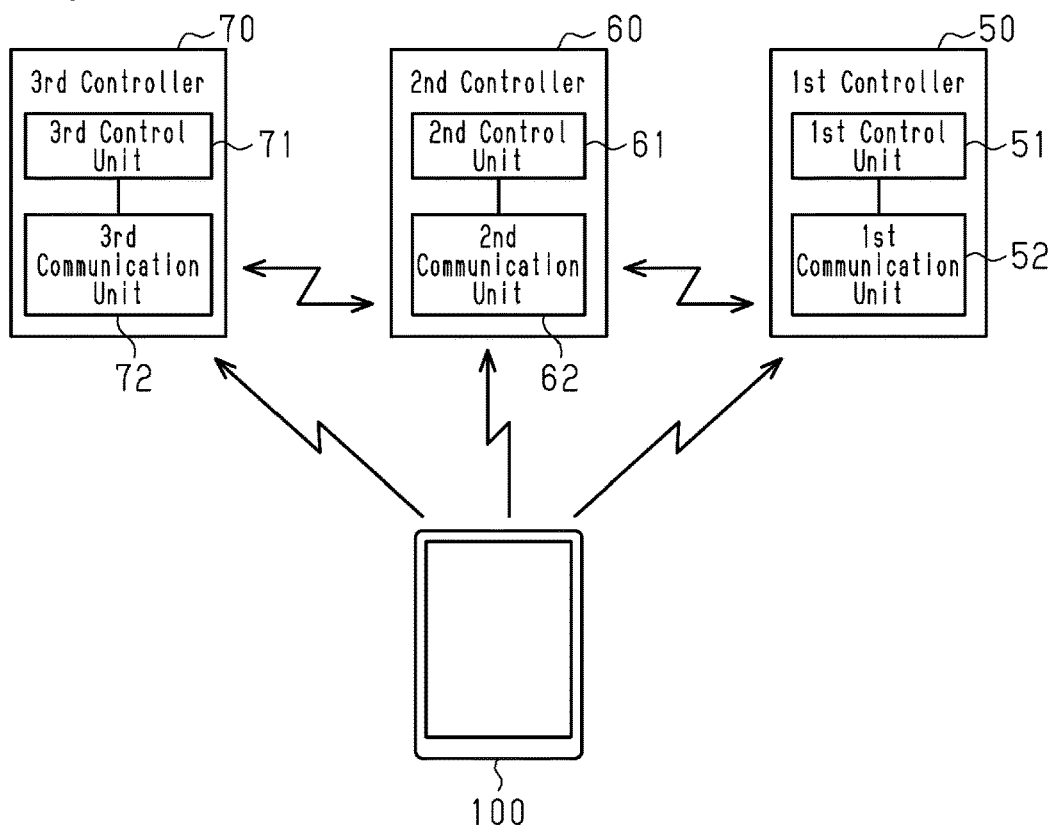
FIG. 16 is a block diagram showing the electrical configuration of another modified example of a refrigeration system.

In each embodiment, the operator may change the setting related to the containers 1A to 1C with a remote operation using an external device. In an example, as shown in FIG. 16, the operator operates a tablet 100, which is an example of the external device, to change the setting related to the containers 1A to 1C. The tablet 100 is configured to communicate with the controllers 50, 60, and 70. The setting related to the containers 1A to 1C includes, for example, the selecting of the synchronized control and the separated control and the setting of the master device and the slave devices. A smartphone may be used instead of the tablet 100. More specifically, the operator may use an external device configured to communicate with the containers 1A to 1C to change the setting related to the containers 1A to 1C. With this configuration, the operator may operate an external device to manually perform the setting of the master device and the slave devices and the setting of control (synchronized control) that synchronously operates the refrigeration apparatuses 20 and control (separated control) that separately operates the refrigeration apparatuses 20.

In each embodiment, at least one of the containers 1A to 1C may be joined in the first direction X. In this case, the wall opposite to the wall 12, on which the refrigeration apparatus 20 is disposed, in the first direction X may be removed to form an opening in each container. The openings may be opposed to each other to join the containers.

In each embodiment, multiple containers including the refrigeration apparatuses 20 may be joined to a container that does not include the refrigeration apparatus 20 to form a stationary storage.

In each embodiment, the refrigeration system 1 has a configuration in which the first container 1A, the second container 1B, and the third container 1C are joined. The number of containers in the refrigeration system 1 is not limited to this and may be changed to any number that is greater than or equal to two. For example, a refrigeration system may have a configuration in which four or more containers are joined.

While the embodiments of the system have been described herein above, it is to be appreciated that various changes in form and detail may be made without departing from the spirit and scope of the system presently or hereafter claimed.

DESCRIPTION OF THE REFERENCE NUMERALS 1) refrigeration system, 1A) first container, 1B) second container, 1C) third container, 20) refrigeration apparatus, 46) intake air temperature detector, 47) blow-out air temperature detector, 51) first control unit (control unit, main control unit), 52) first communication unit (communication unit), 53) first control unit (control unit), 54) clock, 61) second control unit (control unit, slave control unit), 62) second communication unit (communication unit), 63) second operating unit (operating unit), 64) clock, 71) third control unit (control unit, slave control unit), 72) third communication unit (communication unit), 73) third operating unit (operating unit), 74) clock, 90) server, 91) main control unit, 100) tablet (external device)

The invention claimed is:

1. A refrigeration system comprising:
multiple containers joined together to form a storage, the multiple containers each including a refrigeration apparatus, wherein
the refrigeration apparatuses of the containers each include a controller and a communication circuit,
the communication circuits of the refrigeration apparatuses of the containers are configured so that the refrigeration apparatuses of the containers connect and communicate with each other,
the controller of one of the refrigeration apparatuses of the containers is set to a main controller,
the controller of a remaining one of the refrigeration apparatuses is set to a slave controller,
the communication circuits in the refrigeration apparatuses of the containers allow the main controller and the slave controller to communicate with each other,
when a defrosting operation is performed, the main controller sends time information of a clock to the slave controller, the time information indicating when the clock has reached a scheduled time, and causes the refrigeration apparatuses of the containers to operate in synchronization with each other based on the time information of the clock.

2. The refrigeration system according to claim 1, wherein when the refrigeration apparatuses of the containers start the defrosting operation, the main controller synchronizes timing at which the refrigeration apparatuses of the containers start the defrosting operation.

3. The refrigeration system according to claim 1, wherein when the refrigeration apparatuses of the containers end the defrosting operation, the main controller synchronizes timing at which the refrigeration apparatuses of the containers end the defrosting operation.

4. The refrigeration system according to claim 1, wherein when the refrigeration apparatuses of the containers end the defrosting operation and then start a refrigerating-cooling operation, the main controller synchronizes timing at which the refrigeration apparatuses of the containers start the refrigerating-cooling operation.

5. The refrigeration system according to claim 1, wherein the communication circuit of a master device and the communication circuit of a slave device send operating information of the master device and operating information of the slave device to each other, and when the master device malfunctions as the master device, a slave controller of the slave device synchronizes the master device with the slave device and controls the master device malfunctioning as the master device based on operating information of the master device before malfunctioning as the master device, or when the master device malfunctions as the master device, the slave controller synchronizes the master device with the slave device and controls the master device malfunctioning as the master device based on operating information of the slave device.

6. The refrigeration system according to claim 1, wherein the refrigeration system causes the refrigeration apparatuses of the containers to separately perform a refrigerating-cooling operation at separate storage set temperatures.

7. The refrigeration system according to claim 6, wherein the refrigeration system controls the refrigeration apparatuses of the containers so that one of the refrigeration apparatuses performing the defrosting operation coincides with one of the refrigeration apparatuses performing an operation other than the defrosting operation.

8. The refrigeration system according to claim 1, wherein the refrigeration system decreases cooling power of one of the refrigeration apparatuses corresponding to a location where a storage temperature is relatively low and increases cooling power of one of the refrigeration apparatuses corresponding to a location where the storage temperature is relatively high.

9. The refrigeration system according to claim 1, wherein
each of the refrigeration apparatuses of the containers includes a blow-out air temperature detector and an intake air temperature detector,
the refrigeration apparatuses of the containers send information related to detection results of the blow-out air temperature detectors and information related to detection results of the intake air temperature detectors of the refrigeration apparatuses of the containers to each other through the communication circuits, and
when the blow-out air temperature detector or the intake air temperature detector of one of the refrigeration apparatuses of the containers is faulty, the controller of the one of the refrigeration apparatuses operates the one of the refrigeration apparatuses based on information related to a detection result of the blow-out air temperature detector or information related to a detection result of the intake air temperature detector of a remaining one of the refrigeration apparatuses.

10. The refrigeration system according to claim 1, wherein
one of the refrigeration apparatuses having the main controller is a master device,
one of the refrigeration apparatuses having the slave controller is a slave device,
the communication circuit of the master device and the communication circuit the slave device send operating information of the master device and operating information of the slave device to each other, and
at least one of setting of control that synchronously operates the refrigeration apparatuses of the and control that separately operates the refrigeration apparatuses of the containers or setting of the master device and the slave device is performed by an operating unit or a remote operation,
the operating unit is disposed on the refrigeration apparatuses of the containers, and
the remote operation is performed from an external device communicating with the communication circuits.

11. The refrigeration system according to claim 2, wherein when the refrigeration apparatuses of the containers end the defrosting operation, the main controller synchronizes timing at which the refrigeration apparatuses of the containers end the defrosting operation.

12. The refrigeration system according to claim 2, wherein when the refrigeration apparatuses of the containers end the defrosting operation and then start a refrigerating-cooling operation, the main controller synchronizes timing at which the refrigeration apparatuses of the containers start the refrigerating-cooling operation.

13. The refrigeration system according to claim 3, wherein when the refrigeration apparatuses of the containers end the defrosting operation and then start a refrigerating-cooling operation, the main controller synchronizes timing at which the refrigeration apparatuses of the containers start the refrigerating-cooling operation.

* * * * *